United States Patent
Bergström et al.

(10) Patent No.: US 12,389,414 B2
(45) Date of Patent: Aug. 12, 2025

(54) METHODS SCHEDULING FOR DUAL-DRX AND RELATED WIRELESS DEVICES

(71) Applicant: Telefonaktiebolaget LM Ericsson (publ), Stockholm (SE)

(72) Inventors: Mattias Bergström, Sollentuna (SE); Martin Van Der Zee, Malmö (SE); Magnus Stattin, Upplands Väsby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 752 days.

(21) Appl. No.: 17/764,178

(22) PCT Filed: Sep. 23, 2020

(86) PCT No.: PCT/EP2020/076457
§ 371 (c)(1),
(2) Date: Mar. 26, 2022

(87) PCT Pub. No.: WO2021/058496
PCT Pub. Date: Apr. 1, 2021

(65) Prior Publication Data
US 2022/0377787 A1   Nov. 24, 2022

Related U.S. Application Data

(60) Provisional application No. 62/906,628, filed on Sep. 26, 2019.

(51) Int. Cl.
*H04W 72/23* (2023.01)
*H04W 24/08* (2009.01)
*H04W 72/1263* (2023.01)

(52) U.S. Cl.
CPC .......... *H04W 72/23* (2023.01); *H04W 24/08* (2013.01); *H04W 72/1263* (2013.01)

(58) Field of Classification Search
CPC .. H04W 72/23; H04W 24/08; H04W 72/1263
See application file for complete search history.

(56) References Cited

U.S. PATENT DOCUMENTS

| 2017/0202043 A1* | 7/2017 | Seo ........................ H04W 16/14 |
| 2017/0238252 A1* | 8/2017 | Dalsgaard ......... H04W 74/0833 370/311 |

(Continued)

OTHER PUBLICATIONS

"UE Adaptation to the Traffic and UE power Consumption Characteristics, "3GPP TSG-RAN WG1 Ad-Hoc Meeting #1901, R1-1900911, Taipei, Taiwan, Jan. 21-25, 2019, Agenda Item 7.2.9.2.1, Qualcomm Incorporated 24 pages (Year: 2019).*

(Continued)

*Primary Examiner* — Siming Liu
(74) *Attorney, Agent, or Firm* — Sage Patent Group

(57) ABSTRACT

A method is disclosed to operate a wireless device configured for communication with a wireless network using first and second sets of cells. The first set of cells is associated with a first inactivity timer duration, the second set of cells is associated with a second inactivity timer duration, and the first and second inactivity timer durations are different. A scheduling grant is received for a cell of the second set of cells using a cell of the first set of cells. Responsive to receiving the scheduling grant, the cell of the first set of cells is monitored for subsequent grants for the cell of the second set of cells for a period following the scheduling grant defined by the first inactivity timer duration or defined by the second inactivity timer duration. Related wireless devices are also discussed.

18 Claims, 15 Drawing Sheets

(56) References Cited

U.S. PATENT DOCUMENTS

2020/0213067 A1* 7/2020 Cirik ............... H04L 1/1678
2021/0051698 A1* 2/2021 Tsai ............... H04W 72/23

OTHER PUBLICATIONS

International Search Report and Written Opinion of the International Searching Authority, PCT/EP2020/076457, mailed Nov. 20, 2020, 16 pages.
3rd Generation Partnership Project; Technical Specification Group Radio Access Network; Evolved Universal Terrestrial Radio Access (E-UTRA); Medium Access Control (MAC) protocol specification (Release 15) 3GPP TS 36.321 V15.6.0 (Jun. 2019) 133 pages.
3rd Generation Partnership Project; Technical Specification Group Radio Access Network; NR; Medium Access Control (MAC) protocol specification (Release 15) 3GPP TS 38.321 V15.6.0 (Jun. 2019) 78 pages.
"On UE Adaptation to the Traffic," 3GPP TSG RAN WG1 Ad-Hoc Meeting #1901, R1-1901188, Taipei, Taiwan, Jan. 21-25, 2018, Agenda Item 7.2.9.2.1, Nokia, Nokia Shanghai Bell, (XP051594031) 13 pages.
"UE Adaptation to the Traffic and UE Power Consumption Characteristics," 3GPP TSG-RAN WG1 Ad-Hoc Meeting #1901, R1-1900911, Taipei, Taiwan, Jan. 21-25, 2019, Agenda Item 7.2.9.2.1, Qualcomm Incorporated (XP051593757) 24 pages.
Search Report, European Patent Application No. 20781322.1, mailed Apr. 25, 2024, 12 pages.
3GPP TSG-RAN WG1 #96, Athens, Greece, Feb. 25-Mar. 1, 2019, R1-1903016, Agenda Item 7.2.9.2, Qualcomm Incorporated, Potential Techniques for UE Power Saving, 33 pages.
3GPP TSG-RAN WG1 #96, Athens, Greece, Feb. 25-Mar. 1, 2019, R1-1902031, Agenda Item 7.2.9.2, ZTE, Discussion on potential techniques for UE power saving, 22 pages.

* cited by examiner

METHODS SCHEDULING FOR DUAL-DRX AND RELATED WIRELESS DEVICES

CROSS REFERENCE TO RELATED APPLICATIONS

This application is a 35 U.S.C. § 371 national stage application of PCT International Application No. PCT/EP2020/076457 filed on Sep. 23, 2020, which in turn claims domestic priority to U.S. Provisional Patent Application No. 62/906,628, filed on Sep. 26, 2019, the disclosures and content of which are incorporated by reference herein in their entirety.

TECHNICAL FIELD

The present disclosure relates generally to communications, and more particularly to communication methods and related devices and nodes supporting wireless communications.

BACKGROUND

A UE (User Equipment, and referred to as a wireless device) may be configured with a DRX (discontinuous reception) configuration in connected mode to save battery. When DRX is configured the UE is only required to monitor PDCCH (Physical Downlink Control Channel) when the UE is in "Active Time," but when the UE is not in Active Time, the UE can skip PDCCH monitoring and hence save power (reduce battery usage).

Below is an excerpt from 3GPP TS 38.321 v15.6.0 section 5.7 which defines when the UE is considered to be in Active Time.

When a DRX cycle is configured, the Active Time includes the time while:
- drx-onDurationTimer or drx-InactivityTimer or drx-RetransmissionTimerDL or drx-RetransmissionTimerUL or ra-ContentionResolutionTimer (as described in clause 5.1.5) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

In this section, PUCCH is an acronym for Physical Uplink Control Channel, MAC is an acronym for Medium Access Control, and C-RNTI is an acronym for Cell Radio Network Temporary Identifier.

The UE starts the drx-onDurationTimer (sometimes referred to only as onDuration or similar) periodically and the period is referred to as the DRX cycle. Or in other words, the UE will once every DRX cycle start the onDuration timer and hence be in Active Time and monitor PDCCH. The longer the DRX cycle is the longer the UE can be "asleep" between OnDurations. And the longer the onDuration is, the longer time the UE will stay awake each DRX cycle.

However, since it is likely that if the network schedules the UE, the network would want to continue to schedule the UE for a while. Consider for example that the UE is downloading a file. The network would then have to wait until the UE wakes up (i.e., until the next onDuration) and then the network can start sending data to the UE. But if the onDuration is short, the network may not be able to complete the data transfer to the UE. To address this, the drx-InactivityTimer (or just "inactivity timer" or similar) is used. The inactivity timer is started by the UE each time the UE is scheduled (i.e. the UE receives a grant to send UL data after it sends a Scheduling Request, or UE receives downlink assignment because NW (Network) wants to send DL (DownLink) data). So even if the onDuration would be short, the UE starts the inactivity timer if it gets schedule and hence the UE will stay in Active Time as long as the UE keeps on getting scheduled.

The period between OnDurations is called "DRX cycle". In other words, the UE will once per DRX cycle start the onDuration time which means that the UE will be in Active time DRX cycles and the drx-InactivityTimer are discussed below.

A UE configured with the DRX can be configured with both long and short DRX cycles. The intention with the long DRX cycle is that the UE should be able to sleep a long time between waking up, while in short DRX cycle the UE wakes up more frequently. These time periods that the UE is awake to listen for scheduling requests is called OnDuration periods, and is configured for a certain time duration that the UE shall be awake. The UE first drops into a short DRX cycle, where the UE is still relatively quickly reachable, but if there is not traffic for some time, the UE drops into the long DRX cycle.

When the UE is scheduled the drx-InactivityTimer is started, and while this timer is running, the UE is in Active Time and hence monitors PDCCH. When the drx-InactivityTimer expires, the UE will go to short DRX sleep, if configured, otherwise the UE will go to long DRX sleep.

If the UE has not been scheduled for a configured number of short DRX cycles the UE will start applying long DRX cycles.

Dual DRX is discussed below.

It has been proposed to introduce, a so called, dual DRX. In one version of dual DRX, the UE has two different values for the drx-InactivityTimer and two different values for the onDuration timers. The UE would for one set of cells apply a first drx-InactivityTimer value and a first onDuration timer value, while for another set of cells apply a second drx-InactivityTimer value and a first onDuration timer value.

Note that in Dual Connectivity scenarios, the UE has two MAC (Medium Access Control) entities and each MAC entity has its own DRX operation. However, with dual DRX the UE would have two DRX processes per MAC entity, i.e. in total four DRX processes/procedures.

Cross-carrier/cell scheduling and self-scheduling is discussed below.

There is a feature called cross-carrier scheduling in NR (New Radio). The opposite of cross-carrier scheduling is, so-called, self-scheduling. Note that in the 3GPP specifications the terms "carrier" and "cell" are used interchangeably, so "cross-carrier scheduling" could be seen as "cross-cell scheduling", i.e. one cell scheduling another cell. Here it is described how self-scheduling and cross carrier scheduling works by using an example with a cell A and a cell B.

In self-scheduling the scheduling for a cell is provided on the PDCCH of that cell itself. An uplink grant received on the PDCCH of cell A is valid for a transmission on cell A; and a downlink assignment received on the PDCCH of cell A is for a downlink transmission on cell A.

In cross-carrier scheduling the scheduling for a cell is provided on the PDCCH of another cell. An uplink grant is received on the PDCCH of cell A but that grant is valid for an uplink transmission on cell B; and a downlink assignment is received on the PDCCH of cell A but it is for a downlink transmission on cell B.

The term "scheduling cell" is used for a cell which schedules cells (schedule itself, or schedule other cells) while the term "scheduled" cell is used for a cell which gets scheduled. "To schedule" comprises providing uplink grants/downlink assignments. Basically, if a scheduling is "for" a cell then the scheduled transmission/reception will happen on/using that cell. But if scheduling is "on" a cell, that just means that the DL-assignment/UL-grant is sent on/using that cell, and in cross-carrier scheduling the cells are different, while for self-scheduling the cells are the same.

Problems may occur, however, when cross-carrier/cross-cell scheduling in dual-DRX is performed with different inactivity timer durations associated with the scheduling and scheduled cells.

SUMMARY

It may be an object of the invention to provide measures with which monitoring of a cell in cross-carrier scheduling scenarios can be performed in an energy efficient way.

According to some embodiments of inventive concepts, a method of operating a wireless device configured for communication with a wireless network using first and second sets of cells is provided. The first set of cells is associated with a first inactivity timer duration, the second set of cells is associated with a second inactivity timer duration, and the first and second inactivity timer durations are different. A scheduling grant for a cell of the second set of cells is received using a cell of the first set of cells. Responsive to receiving the scheduling grant, the cell of the first set of cells is monitored for subsequent grants for the cell of the second set of cells for a period following the scheduling grant defined by the first inactivity timer duration or defined by the second inactivity timer duration.

According to some embodiments of inventive concepts, a wireless device includes processing circuitry, and memory coupled with the processing circuitry. The memory includes instructions that when executed by the processing circuitry causes the wireless device to receive a scheduling grant for a cell of a second set of cells using a cell of a first set of cells. The first set of cells is associated with a first inactivity timer duration, the second set of cells is associated with a second inactivity timer duration, and the first and second inactivity timer durations are different. The memory also includes instructions that when executed by the processing circuitry causes the wireless device to, responsive to receiving the scheduling grant, monitor the cell of the first set of cells for subsequent grants for the cell of the second set of cells for a period following the scheduling grant defined by the first inactivity timer duration or defined by the second inactivity timer duration.

According to some embodiments of inventive concepts, a wireless device is adapted to receive a scheduling grant for a cell of a second set of cells using a cell of a first set of cells. The first set of cells is associated with a first inactivity timer duration, the second set of cells is associated with a second inactivity timer duration, and the first and second inactivity timer durations are different. The wireless device is also adapted to, responsive to receiving the scheduling grant, monitor the cell of the first set of cells for subsequent grants for the cell of the second set of cells for a period following the scheduling grant defined by the first inactivity timer duration or defined by the second inactivity timer duration.

According to some embodiments, by monitoring the scheduling cell (i.e., the cell of the first set of cells associated with the first inactivity timer duration) for subsequent grants for the scheduled cell (i.e., the cell of the second set of cells associated with the second inactivity timer duration) for the period following the scheduling grant, the wireless device may stay awake for a sufficient time to efficiently receive subsequent grants for the scheduled cell. Moreover, use of the first or second inactivity timer duration may reduce power consumption.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
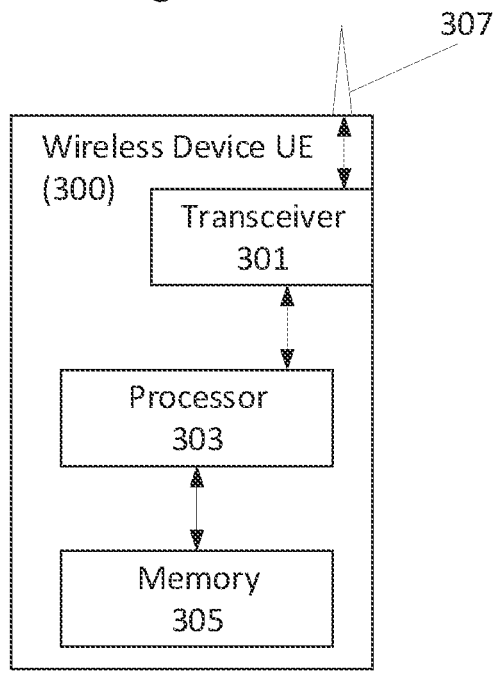
FIG. 1 is a block diagram illustrating a wireless device UE according to some embodiments of inventive concepts.

FIG. 1 is a block diagram illustrating elements of a wireless device UE 300 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 300 may be provided, for example, as discussed below with respect to wireless device QQ110 of FIG. 8.) As shown, wireless device UE may include an antenna 307 (e.g., corresponding to antenna QQ111 of FIG. 8), and transceiver circuitry 301 (also referred to as a transceiver, e.g., corresponding to interface QQ114 of FIG. 8) including a transmitter and a receiver configured to provide uplink and downlink radio communications with a base station(s) (e.g., corresponding to network node QQ160 of FIG. 8, also referred to as a RAN node) of a radio access network. Wireless device UE may also include processing circuitry 303 (also referred to as a processor, e.g., corresponding to processing circuitry QQ120 of FIG. 8) coupled to the transceiver circuitry, and memory circuitry 305 (also referred to as memory, e.g., corresponding to device readable medium QQ130 of FIG. 8) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 2:
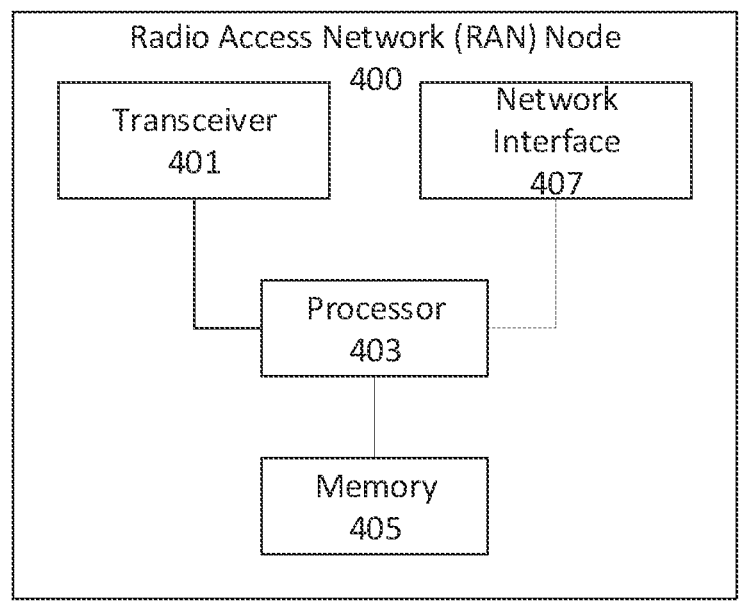
FIG. 2 is a block diagram illustrating a radio access network RAN node (e.g., a base station eNB/gNB) according to some embodiments of inventive concepts.

FIG. 2 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node QQ160 of FIG. 8.) As shown, the RAN node may include transceiver circuitry 401 (also referred to as a transceiver, e.g., corresponding to portions of interface QQ190 of FIG. 8) including a transmitter and a receiver configured to provide uplink and downlink radio communications with mobile terminals. The RAN node may include network interface circuitry 407 (also referred to as a network interface, e.g., corresponding to portions of interface QQ190 of FIG. 8) configured to provide communications with other nodes (e.g., with other base stations) of the RAN and/or core network CN. The network node may also include processing circuitry 403 (also referred to as a processor, e.g., corresponding to processing circuitry QQ170) coupled to the transceiver circuitry, and memory circuitry 405 (also referred to as memory, e.g., corresponding to device readable medium QQ180 of FIG. 8) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 3:
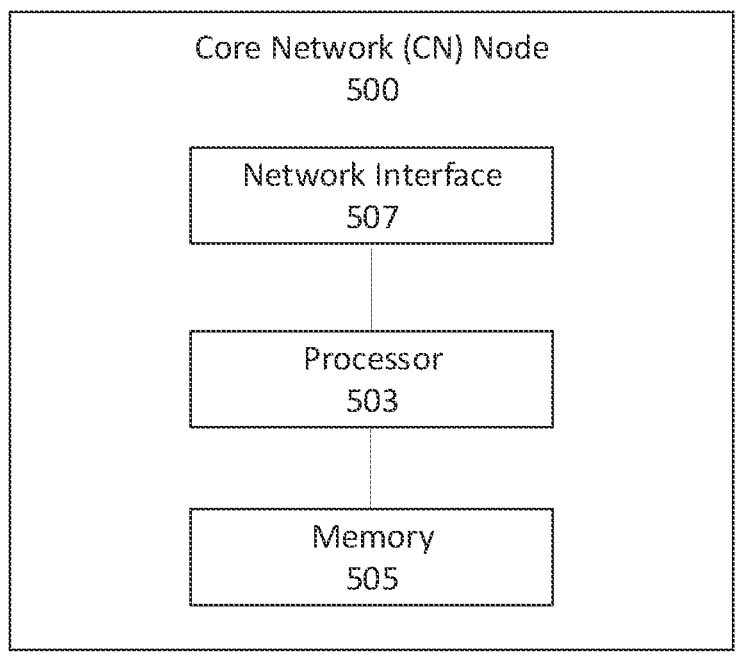
FIG. 3 is a block diagram illustrating a core network CN node (e.g., an AMF node, an SMF node, etc.) according to some embodiments of inventive concepts.

FIG. 3 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations.

For dual-DRX there may be two inactivity timers, one for each group of cells. In case of self-scheduling it is clear which timer the UE shall start; namely if cell X schedules cell X the timer of cell X shall be started and when that inactivity timer is running the UE shall monitor PDCCH of cell X.

However in case of cross-carrier scheduling there may be some problems. For example, if a scheduling cell X is associated with a different inactivity timer than the scheduled cell Y, the UE may not stay awake and monitor for further scheduling on cell X if the UE starts the inactivity timer of cell Y upon being scheduled.

And further, it may in some scenarios cause unnecessary power consumption if the UE starts the inactivity timer of the scheduling cell X with the duration of the inactivity timer duration for scheduling cell X and during that time the UE monitors the scheduling cell X. An example scenario where this may be the case is where the UE is configured with cells on FR1 and cells on FR2 where, if the UE has to monitor for a long time after each scheduling (i.e., the inactivity timer is long), significant UE power may be wasted.

According to some embodiments of inventive concepts (Example A), the UE may maintain a first inactivity timer and a second inactivity timer where: the UE monitors for scheduling on a first set of cells if the first timer is running, and the UE monitors for scheduling on a second set of cells if the second timer is running. If the first cell schedules the second cell (cross carrier scheduling), the UE starts the first inactivity timer in response to scheduling of the second cell, and if the second cell schedules the second cell (self-scheduling), the UE starts the second inactivity timer in response to scheduling of the second cell.

Such embodiments may allow, for example, that if an FR1 cell schedules the FR2 cell, the UE will keep on monitoring PDCCH on the FR1 cell.

According to some other embodiments of inventive concepts (Example B), the UE maintains a first inactivity timer and a second inactivity timer where: the UE monitors for scheduling on a first set of cells if the first timer is running, and the UE monitors for scheduling on a second set of cells if the second timer is running. If the first cell schedules the second cell (cross carrier scheduling), the UE starts the first inactivity timer in response to scheduling of the second cell and the duration used to start the timer is a value associated with the second cell. If the second cell schedules the second cell (self-scheduling), the UE starts the second inactivity timer in response to scheduling of the second cell and the duration used to start the timer is a value associated with the first cell.

According to still other embodiments of inventive concepts (Example C), the UE maintains a first inactivity timer and a second inactivity timer where: the UE monitors scheduling for a first set of cells if the first inactivity timer is running, and the UE monitors scheduling for a second set of cells if the second inactivity timer is running. The UE starts the first inactivity timer in response to a first cell scheduling a cell in the first set of cells. The UE starts the second inactivity timer in response to a second cell scheduling a cell in the second set of cells. The UE starts the second inactivity timer in response to a first cell scheduling a cell in the second set of cells. Such embodiments may allow, for example, that if an FR1 cell schedules an FR2 cell, that the UE applies a shorter inactivity timer, and also that the UE actually monitors PDCCH for the FR2 cell when this happens.

Methods according to some embodiments may use as an example dual-DRX, but the methods could be applied also in scenarios where more than two DRX are used.

It is herein described how the UE starts timers, and in particular inactivity timers. It shall be appreciated that even if a timer is running, the timer can be started (which may be referred to as that the timer is restarted) but the timer would then be started with a new duration. For example, if the initial timer duration is 10 milliseconds but the timer has been running 2 milliseconds, and if the timer is then started/restarted, the timer duration would reset so that 10 milliseconds remain.

It will herein be used as examples that there are cells in a low frequency range (denoted as Frequency Range 1 (FR1)) and cells in a high frequency range (denoted as Frequency Range 2 (FR2)) and the UE has been configured in a way such that the UE shall monitor FR2 cells less often/shorter durations than FR1 cells. This may be a likely configuration since it consumes more power to monitor cells in a higher frequency and hence the amount of monitoring should be lower for FR2 cells. In the embodiments, it is sometimes used as examples that cells in a first group are FR1 cells and cells in a second group are FR2 cells, however this is just used as an example and the embodiments can be applied in a more general situations where cells are not necessarily grouped based on FR1/FR2.

According to some embodiments (Example A), a UE keeps on monitoring on the scheduling cell(s). In these embodiments the UE monitors: a first set of PDCCHs when a first inactivity timer is running, and a second set of PDCCHs when a second timer is running.

An inactivity timer could then be seen to be associated to certain set of PDCCHs and the UE monitors all PDCCHs in that set, when the associated inactivity timer is running.

The UE starts the timer associated to a set of PDCCHs whenever any PDCCH in that set schedules a cell.

In case a cell X is configured to schedule itself (i.e. self-scheduling) but also configured to schedule other cells (i.e. cross-carrier scheduling): if cell X (e.g. FR1 cell) schedules itself the timer associated with cell X will be started, and if cell X schedules a cell Y (e.g. FR2 cell) the UE will (also in this case) start the timer associated with cell X.

In an example illustrating embodiment A, the UE has five cells, A, B, C, D and E. The cells are schedules as follows: cell A (FR1) schedules itself; cell B (FR1) is scheduled by cell A; cell C (FR2) schedules itself; cell D (FR2) schedules itself; and cell E (FR2) is scheduled by cell A.

Further, Cell A and Cell B are associated with a first, e.g. long, timer value. While cell C, D and E are associated with a second, e.g. short, timer value (where timer values are also referred to as inactivity timer durations). In such embodiments, the UE would:

when cell A is scheduled, start the first/long timer and for the duration of this timer the UE will monitor PDCCH on cell A.

when cell B is scheduled, start the first/long timer and for the duration of this timer the UE will monitor PDCCH on cell A (which is the cell which schedules cell B).

when cell C is scheduled, start the second/short timer and for the duration of this timer the UE will monitor PDCCH on cell C and D.

when cell D is scheduled, start the second/short timer and for the duration of this timer the UE will monitor PDCCH on cell C and D.

when cell E is scheduled, start the first/long timer and for the duration of this timer the UE will monitor PDCCH on cell A.

According to some other embodiments (Example B), the UE keeps on monitoring on the scheduling cell(s)—duration depends on which is the scheduled cell. In this embodiment the UE monitors: a first set of PDCCHs when a first inactivity timer is running, and a second set of PDCCHs when a second timer is running.

An inactivity timer could then be seen to be associated to certain set of PDCCHs and the UE monitors all PDCCHs in that set, when the associated inactivity timer is running.

The UE starts the timer associated with a set of PDCCHs whenever any PDCCH in that set schedules a cell. The value with which a timer is started depends on which cell was scheduled. If the cell which is scheduled is associated with a long timer duration, the inactivity timer would be started with a long timer duration, but if the cell which is scheduled is associated with a short timer duration, the inactivity timer would be started with a short timer duration.

In case both a cell associated with a long inactivity timer duration and a cell associated with a short inactivity timer duration is scheduled, the above dictates that the UE shall start the timer with both a long and a short duration, but in this scenario the UE may apply the longer timer duration when starting the timer.

In case an inactivity timer is already running and, based on the above, the UE shall start the inactivity timer and the value with which the inactivity timer shall be started with is shorter than the remaining duration of the timer at this moment, the UE may refrain from starting/restarting the timer with the shorter value, or in other words, the UE would let the timer continue to run with the (currently) longer remaining duration rather than shortening the timer duration.

In case a cell X is configured to schedule itself (i.e. self-scheduling) but also configured to schedule other cells (i.e. cross-carrier scheduling): if cell X (e.g. FR1 cell) schedules itself, the timer associated with cell X will be started but in this case with the value associated with cell X; and if cell X schedules a cell Y (e.g. FR2 cell), the UE will (also in this case) start the timer associated with cell X, but in this case with the value associated with cell Y.

An example illustrating this embodiment is discussed below. The UE has five cells, A, B, C, D and E. The cells are schedules as follows: cell A (FR1) schedules itself; cell B (FR1) is scheduled by cell A; cell C (FR2) schedules itself; cell D (FR2) schedules itself; and cell E (FR2) is scheduled by cell A.

Further, Cell A and Cell B are associated with a first, e.g. long, timer value (a long inactivity timer duration), while cell C, D and E are associated with a second, e.g. short, timer value (a short inactivity timer duration). In such embodiments, the UE would:

when cell A is scheduled, start a first timer with a first/long value and for the duration of this timer the UE will monitor PDCCH on cell A.

when cell B is scheduled, start a first timer with a first/long value and for the duration of this timer the UE will monitor PDCCH on cell A (which is the cell which schedules cell B).

when cell C is scheduled, start a second timer with a second/short value and for the duration of this timer the UE will monitor PDCCH on cell C and D.

when cell D is scheduled, start a second timer with a second/short value and for the duration of this timer the UE will monitor PDCCH on cell C and D.

when cell E is scheduled, start a first timer with a second/short value and for the duration of this timer the UE will monitor PDCCH on cell A.

According to some other embodiments (Example C), the UE keeps on monitoring for the scheduled cell. In this embodiment the UE monitors: all PDCCH which can schedule a first set of cells (e.g. FR1 cells) if an inactivity timer associated with that set is running; and all PDCCH which can schedule a second group of cells (e.g. FR2 cells) if an inactivity timer associated with that set is running.

An inactivity timer could then be seen to be associated to certain set of cells and the UE monitors all PDCCHs which can schedule a cell in that set, when the associated inactivity timer is running.

The UE starts the inactivity timer for a set of cells whenever a cell in the set gets scheduled.

In case of cross-carrier scheduling, if a cell X (e.g. FR1 cell) schedules itself it will start the timer associated with the cell X (i.e. a timer associated with FR1 cells). While if the cell X schedules a cell Y (e.g. FR2 cell) the UE will start the timer associated with cell Y.

This may provide/ensure that if a cell in a certain group is scheduled, the UE will keep on monitoring all PDCCHs which may contain further scheduling for the cells in this group. For example, scheduling of an FR2 cell would start a timer associated with monitoring for FR2 cells and the UE will then continue to monitor all PDCCHs which can schedule FR2 cells.

An example illustrating such embodiments is discussed below. The UE has five cells, A, B, C, D and E. The cells are scheduled as follows: cell A (e.g. on FR1) schedules itself; cell B (e.g. on FR1) is scheduled by cell A; cell C (e.g. on FR2) schedules itself; cell D (e.g. on FR2) schedules itself; and cell E (e.g. on FR2) is scheduled by cell A.

Further, FR1 cells are associated with a long timer (a longer inactivity timer duration) while FR2 cells are associated with a short timer (a shorter inactivity timer duration). In such embodiments, the UE would:

when cell A is scheduled, start the long timer and for the duration of this timer the UE will monitor PDCCH for cell A and cell B (namely PDCCH on cell A).

when cell B is scheduled, start the long timer and for the duration of this timer the UE will monitor PDCCH for cell A and cell B (namely PDCCH on cell A).

when cell C is scheduled, start the short timer and for the duration of this timer the UE will monitor PDCCH for cell C, D and E (namely PDCCH on cell C, D and A).

when cell D is scheduled, start the short timer and for the duration of this timer the UE will monitor PDCCH for cell C, D and E (namely PDCCH on cell C, D and A).

when cell E is scheduled, start the short timer and for the duration of this timer the UE will monitor PDCCH for cell C, D and E (namely PDCCH on cell C, D and A).

When it in this embodiment says that the UE monitors PDCCH "for" a group of cells it may mean one of the following approaches:
1. the UE will only monitor and/or act on scheduling of cells in that group, but the UE may ignore scheduling for other cells even if those other cells are scheduled on the same PDCCH. Or in other words by referring to the example above: When cell A or cell B has been scheduled and the UE monitors PDCCH on cell A, the UE would according to this approach act on scheduling for cell A and cell B, but not act on scheduling for cell E. Note that the UE may monitor PDCCH for the "other cells" for other reasons, e.g. there may be some other DRX-related timer which is running which makes the UE monitor for scheduling for other cells than those within the group of cells. Back to the example above: even if the UE, according to this approach, would ignore scheduling for cell E since the UE is monitoring PDCCH "for" cell A and cell B, the UE may anyway act on scheduling for cell E if the UE should monitor PDCCH for cell E for some other reason (e.g. the short timer is running).
2. the UE will when monitoring scheduling for cells in a group act on any scheduling for that cell, i.e. also on cells which are not in the group for which the UE monitors PDCCH. Or in other words by referring to the example above: When cell A or cell B has been scheduled and the UE monitors PDCCH on cell A, the UE would according to this approach act on scheduling for any cell which cell A schedules, namely scheduling for any of cell A, B and E.

When it here says that there is a timer associated with a group of cells, it could comprise either that there is an actual timer associated with the group of cells, or that there is a timer duration (also referred to as an inactivity timer duration) which is associated with the group of cells. And a timer for monitoring a certain set of PDCCHs is started with different duration depending on which group of cells the timer is started for.

Operations of the wireless device 300 (implemented using the structure of the block diagram of FIG. 1) will now be discussed with reference to the flow chart of FIG. 4 according to some embodiments of inventive concepts. For example, modules may be stored in memory 305 of FIG. 1, and these modules may provide instructions so that when the instructions of a module are executed by respective communication device processing circuitry 303, processing circuitry 303 performs respective operations of the flow chart.

Figure 4:
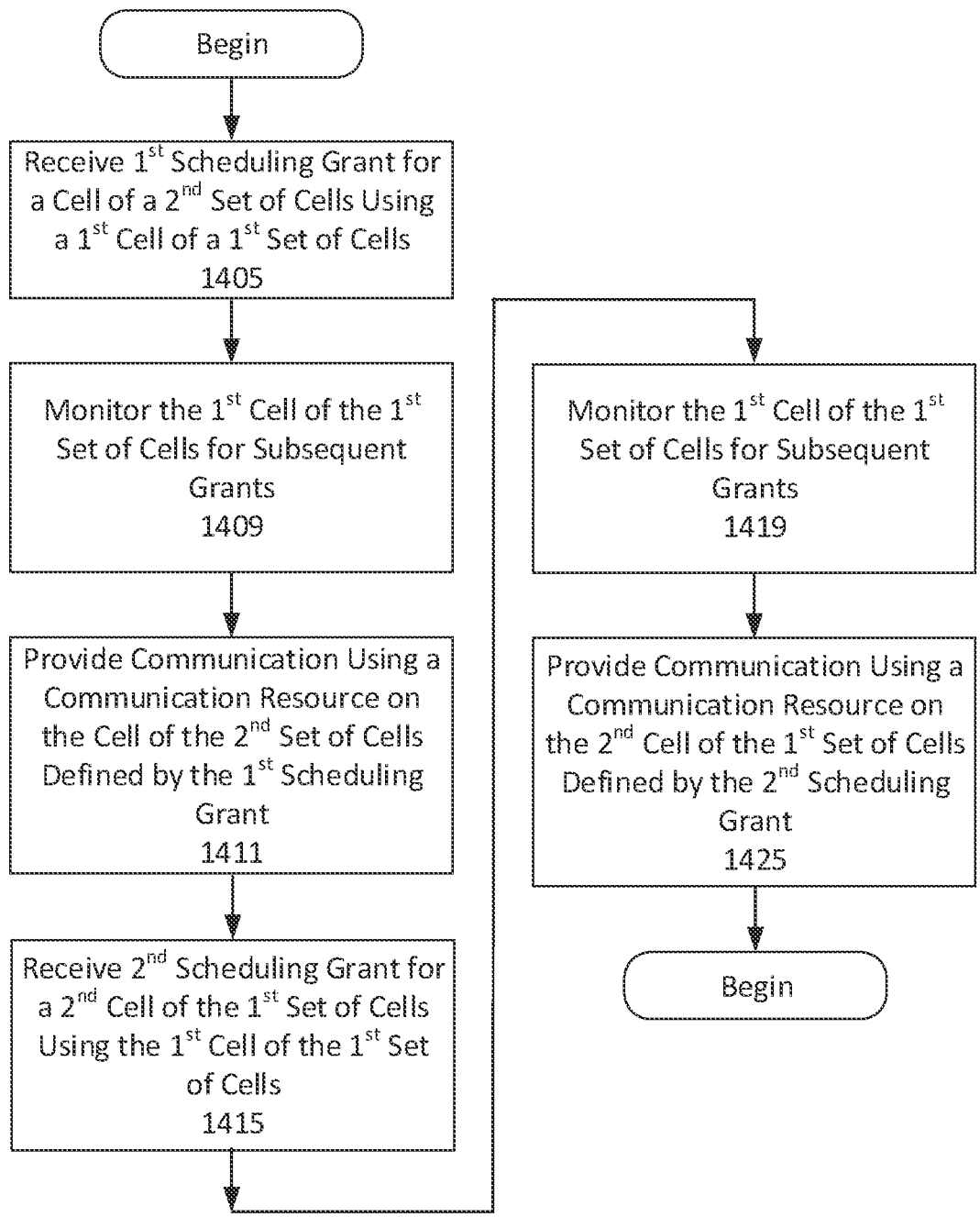
FIGS. 4, 5, 6, and 7 are flow charts illustrating wireless device operations according to some embodiments of inventive concepts.

According to some embodiments of FIG. 4, wireless device 300 is configured for communication with a wireless network using first and second sets of cells. The first set of cells is associated with a first inactivity timer duration, the second set of cells is associated with a second inactivity timer duration, and the first and second inactivity timer durations are different.

According to some embodiments at block 1405, processing circuitry 303 receives (through transceiver 301) a first scheduling grant for a cell of the second set of cells using a first cell of the first set of cells (e.g., receiving the first scheduling grant on the first cell of the first set of cells).

According to some embodiments at block 1409, responsive to receiving the first scheduling grant, processing circuitry 303 monitors the first cell of the first set of cells for subsequent grants for a period following the first scheduling grant defined by the first inactivity timer duration or defined by the second inactivity timer duration. For example, processing circuitry 303 may monitor the first cell of the first set of cells for subsequent grants for the cell of the second set of cells for a period following the scheduling grant defined by the first inactivity timer duration or defined by the second inactivity timer duration.

According to some embodiments at block 1411, processing circuitry 303 provides communication (through transceiver 301) between the wireless device and the wireless network using a communication resource on the cell of the second set of cells defined by the first scheduling grant.

According to some embodiments at block 1415, processing circuitry 303 receives (through transceiver 301) a second scheduling grant for a second cell of the first set of cells using the first cell of the first set of cells (e.g., receiving the second scheduling grant on the first cell of the first set of cells).

According to some embodiments at block 1419, responsive to receiving the second scheduling grant, processing circuitry 303 monitors the first cell of the first set of cells for subsequent grants for a period following the second scheduling grant defined by the first inactivity timer duration. For example, processing circuitry 303 monitors the first cell of the first set of cells for subsequent grants for the second cell of the first set of cells for the period following the second scheduling grant defined by the first inactivity timer duration.

According to some embodiments at block 1425, processing circuitry 303 provides communication (through transceiver 301) between the wireless device and the wireless network using a communication resource on the second cell of the first set of cells defined by the second scheduling grant.

According to some embodiments of FIG. 4, the first set of cells are included in a first frequency range, and the second set of cells are included in a second frequency range. Moreover, the first and second frequency ranges may be non-overlapping. For example, the first frequency range may be lower than the second frequency range, and/or the first inactivity timer duration may be greater than the second inactivity timer duration.

Various operations from the flow chart of FIG. 4 may be optional with respect to some embodiments of wireless devices and related methods. Regarding methods of some embodiments, for example, operations of blocks 1411, 1415, 1419, and/or 1425 of FIG. 4 may be optional.

Operations of the wireless device 300 (implemented using the structure of the block diagram of FIG. 1) will now be discussed with reference to the flow chart of FIG. 5 according to some embodiments of inventive concepts. For example, modules may be stored in memory 305 of FIG. 1, and these modules may provide instructions so that when the instructions of a module are executed by respective communication device processing circuitry 303, processing circuitry 303 performs respective operations of the flow chart.

Figure 5:
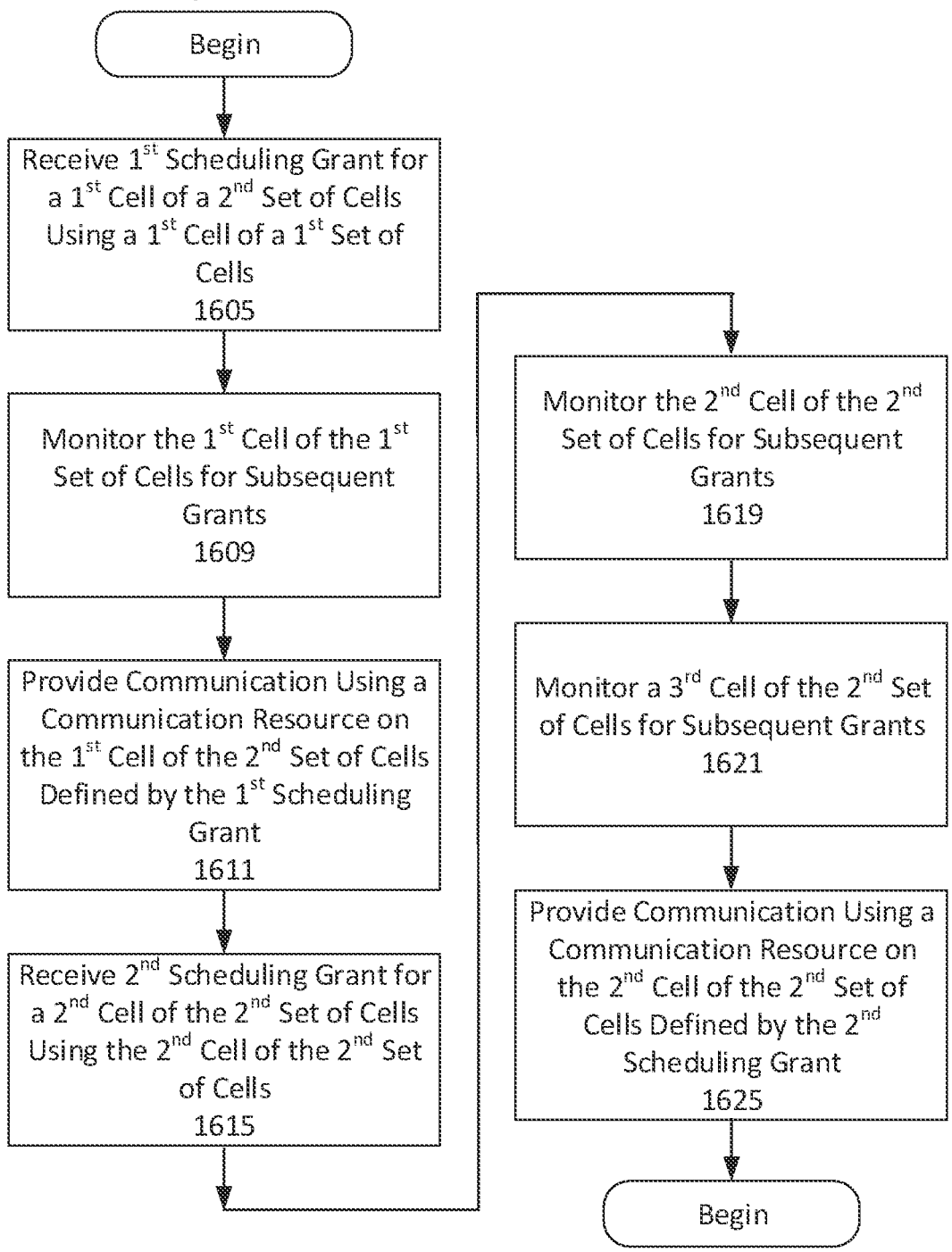

According to some embodiments of FIG. 5, wireless device 300 is configured for communication with a wireless network using first and second sets of cells. The first set of cells is associated with a first inactivity timer duration, the second set of cells is associated with a second inactivity timer duration, and the first and second inactivity timer durations are different.

According to some embodiments at block 1605, processing circuitry 303 receives (through transceiver 301) a first scheduling grant for a first cell of the second set of cells using a first cell of the first set of cells (e.g., receiving the first scheduling grant for the first cell of the second set of cells on the first cell of the first set of cells).

According to some embodiments at block 1609, responsive to receiving the first scheduling grant, processing circuitry 303 monitors the first cell of the first set of cells for subsequent grants for a period following the first scheduling grant defined by the first inactivity timer duration or defined by the second inactivity timer duration. For example, processing circuitry 303 may monitor the first cell of the first set of cells for subsequent grants for the first cell of the second set of cells for a period following the scheduling grant defined by the first inactivity timer duration or defined by the second inactivity timer duration.

According to some embodiments at block 1611, processing circuitry 303 provides communication (through transceiver 301) between the wireless device and the wireless network using a communication resource on the first cell of the second set of cells defined by the first scheduling grant.

According to some embodiments at block 1615, processing circuitry 303 receives (through transceiver 301) a second scheduling grant for a second cell of the second set of cells using the second cell of the second set of cells (e.g., receiving the second scheduling grant on the second cell of the second set of cells).

According to some embodiments at block 1619, responsive to receiving the second scheduling grant, processing circuitry 303 monitors the second cell of the second set of cells for subsequent scheduling grants for a period following the second scheduling grant defined by the second inactivity timer duration. For example, processing circuitry 303 monitors the second cell of the second set of cells for subsequent scheduling grants for the second cell of the second set of cells for a period following the second scheduling grant defined by the second inactivity timer duration.

According to some embodiments at block 1621, responsive to receiving the second scheduling grant, processing circuitry 303 monitors a third cell of the second set of cells for subsequent scheduling grants for the period following the second scheduling grant defined by the second inactivity timer duration. For example, processing circuitry 303 monitors a third cell of the second set of cells for subsequent scheduling grants for the third cell of the second set of cells for the period following the second scheduling grant defined by the second inactivity timer duration.

According to some embodiments at block 1625, processing circuitry 303 provides communication (through transceiver 301) between the wireless device and the wireless network using a communication resource on the second cell of the second set of cells defined by the second scheduling grant.

According to some embodiments of FIG. 5, the first set of cells are included in a first frequency range, and the second set of cells are included in a second frequency range. Moreover, the first and second frequency ranges may be non-overlapping. For example, the first frequency range may be lower than the second frequency range, and/or the first inactivity timer duration may be greater than the second inactivity timer duration.

Various operations from the flow chart of FIG. 5 may be optional with respect to some embodiments of wireless devices and related methods. Regarding methods of some embodiments, for example, operations of blocks 1611, 1615, 1619, 1621, and/or 1625 of FIG. 5 may be optional.

Operations of the wireless device 300 (implemented using the structure of the block diagram of FIG. 1) will now be discussed with reference to the flow chart of FIG. 6 according to some embodiments of inventive concepts. For example, modules may be stored in memory 305 of FIG. 1, and these modules may provide instructions so that when the instructions of a module are executed by respective communication device processing circuitry 303, processing circuitry 303 performs respective operations of the flow chart.

Figure 6:
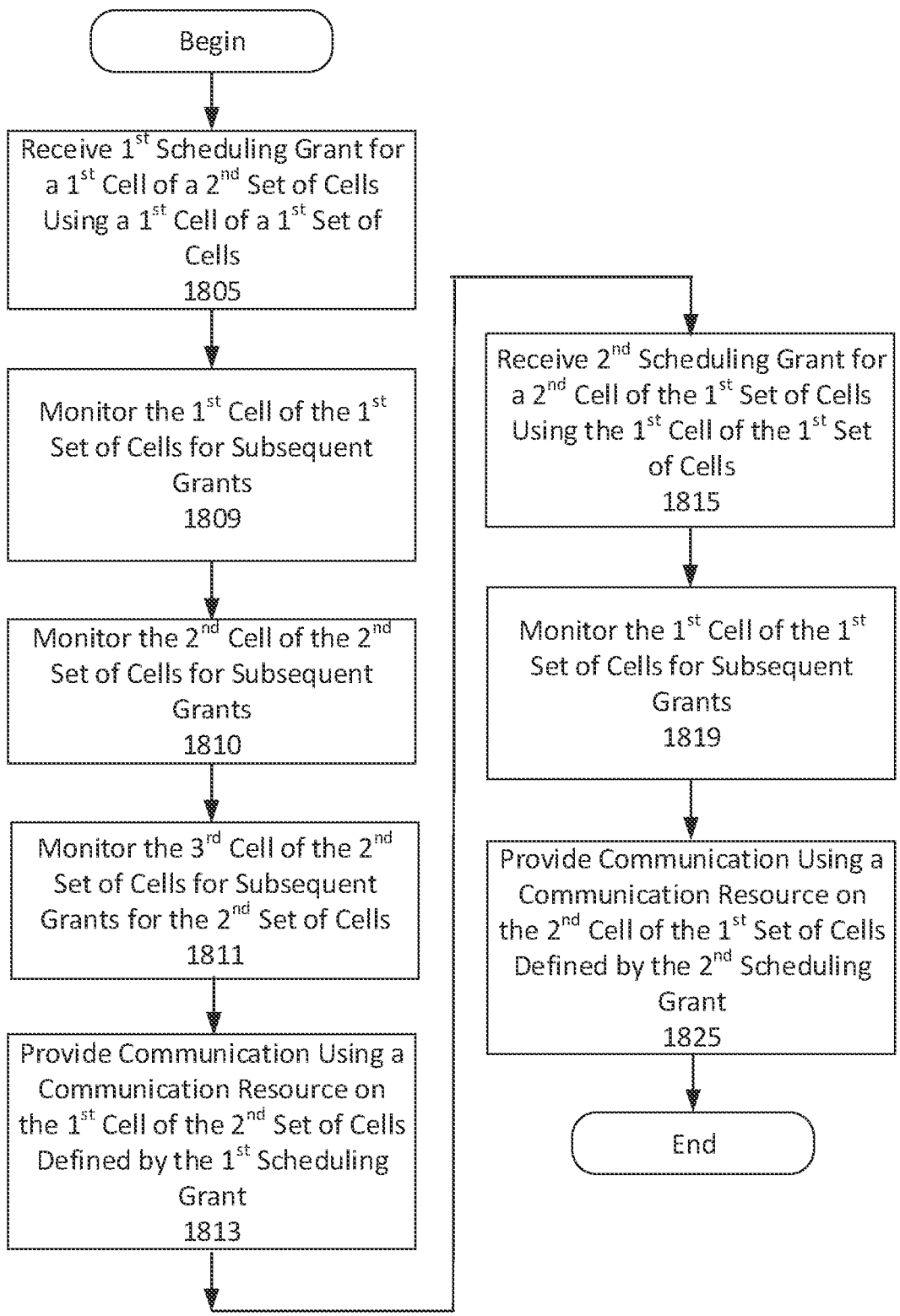

According to some embodiments of FIG. 6, wireless device 300 is configured for communication with a wireless network using first and second sets of cells. The first set of cells is associated with a first inactivity timer duration, the second set of cells is associated with a second inactivity timer duration, and the first and second inactivity timer durations are different.

According to some embodiments at block 1805, processing circuitry 303 receives (through transceiver 301) a first scheduling grant for a first cell of the second set of cells using a first cell of the first set of cells (e.g., receiving the first scheduling grant on the first cell of the first set of cells).

According to some embodiments at block 1809, responsive to receiving the first scheduling grant, processing circuitry 303 monitors the first cell of the first set of cells for subsequent grants for a period following the first scheduling grant defined by the first inactivity timer duration or defined by the second inactivity timer duration. For example, processing circuitry 303 may monitor the first cell of the first set of cells for subsequent grants for the first cell of the second set of cells for a period following the scheduling grant defined by the first inactivity timer duration or defined by the second inactivity timer duration.

According to some embodiments at block 1810, responsive to receiving the first scheduling grant, processing circuitry 303 monitors a second cell of the second set of cells for subsequent grants. For example, processing circuitry 303 may monitor a second cell of the second set of cells for subsequent grants for the second set of cells.

According to some embodiments at block 1811, responsive to receiving the first scheduling grant, processing circuitry 303 monitors a third cell of the second set of cells for subsequent grants for the second set of cells. For example, processing circuitry 303 may monitor a third cell of the second set of cells for subsequent grants for the second set of cells.

According to some embodiments at block 1813, processing circuitry 303 provides communication (through transceiver 301) between the wireless device and the wireless network using a communication resource on the first cell of the second set of cells defined by the first scheduling grant.

According to some embodiments at block 1815, processing circuitry 303 receives (through transceiver 301) a second scheduling grant for a second cell of the first set of cells using the first cell of the first set of cells (e.g., receiving the second scheduling grant on the first cell of the first set of cells).

According to some embodiments at block 1819, responsive to receiving the second scheduling grant, processing circuitry 303 monitors the first cell of the first set of cells for subsequent grants for the first set of cells for a period following the second scheduling grant defined by the first inactivity timer duration. For example, processing circuitry 303 may monitor the first cell of the first set of cells for subsequent grants for the first set of cells for a period following the second scheduling grant defined by the first inactivity timer duration.

According to some embodiments at block 1825, processing circuitry 303 provides communication (through transceiver 301) between the wireless device and the wireless network using a communication resource on the second cell of the first set of cells defined by the second scheduling grant.

According to some embodiments, monitoring the first cell of the first set of cells at block 1809 may include monitoring the first cell of the first set of cells for subsequent grants for the first cell of the second set of cells for a period following the first scheduling grant defined by the second inactivity timer duration, and monitoring the second cell of the second set of cells at block 1810 may include monitoring the second cell of the second set of cells for subsequent grants for the second set of cells for the period following the first scheduling grant defined by the second inactivity timer duration.

According to some embodiments of FIG. 6, the first set of cells are included in a first frequency range, and the second set of cells are included in a second frequency range. Moreover, the first and second frequency ranges may be non-overlapping. For example, the first frequency range may be lower than the second frequency range, and/or the first inactivity timer duration may be greater than the second inactivity timer duration.

Various operations from the flow chart of FIG. 6 may be optional with respect to some embodiments of wireless devices and related methods. Regarding methods of some embodiments, for example, operations of blocks 1810, 1811, 1813, 1815, 1819, and/or 1825 of FIG. 6 may be optional.

Operations of the wireless device 300 (implemented using the structure of the block diagram of FIG. 1) will now be discussed with reference to the flow chart of FIG. 7 according to some embodiments of inventive concepts. For example, modules may be stored in memory 305 of FIG. 1, and these modules may provide instructions so that when the instructions of a module are executed by respective communication device processing circuitry 303, processing circuitry 303 performs respective operations of the flow chart.

Figure 7:
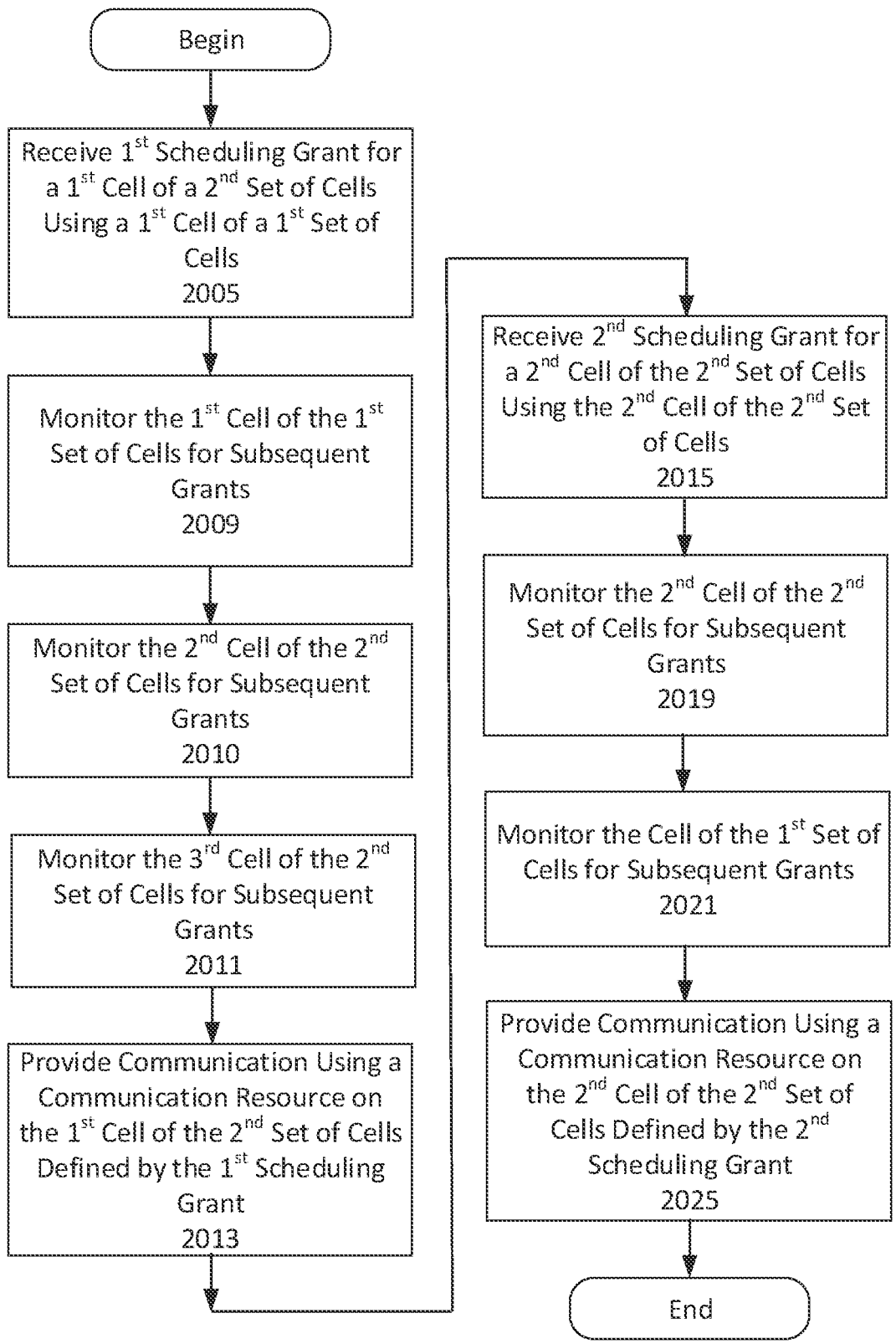

According to some embodiments of FIG. 7, wireless device 300 is configured for communication with a wireless network using first and second sets of cells. The first set of cells is associated with a first inactivity timer duration, the second set of cells is associated with a second inactivity timer duration, and the first and second inactivity timer durations are different.

According to some embodiments at block 2005, processing circuitry 303 receives (through transceiver 301) a first scheduling grant for a first cell of the second set of cells using a first cell of the first set of cells (e.g., receiving the first scheduling grant on the first cell of the first set of cells).

According to some embodiments at block 2009, responsive to receiving the first scheduling grant, processing circuitry 303 monitors the first cell of the first set of cells for subsequent grants for a period following the first scheduling grant defined by the first inactivity timer duration or defined by the second inactivity timer duration. For example, processing circuitry 303 may monitor the first cell of the first set of cells for subsequent grants for the first cell of the second set of cells for a period following the scheduling grant defined by the first inactivity timer duration or defined by the second inactivity timer duration.

According to some embodiments at block 2010, responsive to receiving the first scheduling grant, processing circuitry 303 monitors a second cell of the second set of cells for subsequent grants. For example, processing circuitry 303 may monitor a second cell of the second set of cells for subsequent grants for the second set of cells.

According to some embodiments at block 2011, responsive to receiving the first scheduling grant, processing circuitry 303 monitors a third cell of the second set of cells for subsequent grants. For example, processing circuitry 303 may monitor a third cell of the second set of cells for subsequent grants for the second set of cells.

According to some embodiments at block 2013, processing circuitry 303 provides communication (through transceiver 301) between the wireless device and the wireless network using a communication resource on the first cell of the second set of cells defined by the first scheduling grant.

According to some embodiments at block 2015, processing circuitry 303 receives (through transceiver 301) a second scheduling grant for the second cell of the second set of cells using the second cell of the second set of cells (e.g., receiving the second scheduling grant on the second cell of the second set of cells).

According to some embodiments at block 2019, responsive to receiving the second scheduling grant, processing circuitry 303 monitors the second cell of the second set of cells for subsequent scheduling grants. For example, processing circuitry 303 may monitor the second cell of the second set of cells for subsequent scheduling grants for the second cell of the second set of cells.

According to some embodiments at block 2021, responsive to receiving the second scheduling grant, processing circuitry 303 monitors the cell of the first set of cells for subsequent grants. For example, processing circuitry 303 may monitor the cell of the first set of cells for subsequent grants for the first cell of the second set of cells.

According to some embodiments at block 2025, processing circuitry 303 provides communication (through transceiver 301) between the wireless device and the wireless network using a communication resource on the second cell of the second set of cells defined by the second scheduling grant.

According to some embodiments, monitoring the first cell of the first set of cells at block 2009 may include monitoring the first cell of the first set of cells for subsequent grants for the first cell of the second set of cells for a period following the first scheduling grant defined by the second inactivity timer duration, and monitoring the second cell of the second set of cells at block 2010 may include monitoring the second cell of the second set of cells for subsequent grants for the second set of cells for the period following the first scheduling grant defined by the second inactivity timer duration.

According to some embodiments, monitoring the second cell of the second set of cells responsive to receiving the second scheduling grant at block 2019 may include monitoring the second cell of the second set of cells for subsequent scheduling grants for the second cell of the second set of cells for a period following the second scheduling grant defined by the second inactivity timer duration, and monitoring the first cell of the first set of cells responsive to receiving the second scheduling grant at block 2021 may include monitoring the first cell of the first set of cells for subsequent grants for the first cell of the second set of cells for a period following the second scheduling grant defined by the second inactivity timer duration.

According to some embodiments of FIG. 7, the first set of cells are included in a first frequency range, and the second set of cells are included in a second frequency range. Moreover, the first and second frequency ranges may be non-overlapping. For example, the first frequency range may be lower than the second frequency range, and/or the first inactivity timer duration may be greater than the second inactivity timer duration.

Various operations from the flow chart of FIG. 7 may be optional with respect to some embodiments of wireless devices and related methods. Regarding methods of some embodiments, for example, operations of blocks 2010, 2011, 2013, 2015, 2019, 2021, and/or 2025 of FIG. 7 may be optional.

Example embodiments are discussed below.

1. A method of operating a wireless device configured for communication with a wireless network using first and second sets of cells, wherein the first set of cells is associated with a first inactivity timer duration, wherein the second set of cells is associated with a second inactivity timer duration, and wherein the first and second inactivity timer durations are different, the method comprising: receiving a scheduling grant for a cell of the second set of cells using a cell of the first set of cells; and responsive to receiving the scheduling grant, monitoring the cell of the first set of cells for subsequent grants for the cell of the second set of cells for a period following the scheduling grant defined by the first inactivity timer duration.
2. The method of Embodiment 1, wherein the cell of the first set of cells is a first cell of the first set of cells, and wherein the scheduling grant is a first scheduling grant, the method further comprising: receiving a second scheduling grant for a second cell of the first set of cells using the first cell of the first set of cells; and responsive to receiving the second scheduling grant, monitoring the first cell of the first set of cells for subsequent grants for the second cell of the first set of cells for a period following the second scheduling grant defined by the first inactivity timer duration.
3. The method of Embodiment 2 further comprising: providing communication between the wireless device and the wireless network using a communication resource on the second cell of the first set of cells defined by the second scheduling grant.
4. The method of Embodiment 1, where the cell of the second set of cells is a first cell of the second set of cells, and wherein the scheduling grant is a first scheduling grant, the method further comprising: receiving a second scheduling grant for a second cell of the second set of cells using the second cell of the second set of cells; and responsive to receiving the second scheduling grant, monitoring the second cell of the second set of cells for subsequent scheduling grants for the second cell of the second set of cells for a period following the second scheduling grant defined by the second inactivity timer.
5. The method of Embodiment 4 further comprising: responsive to receiving the second scheduling grant, monitoring a third cell of the second set of cells for subsequent scheduling grants for the third cell of the second set of cells for the period following the second scheduling grant defined by the second inactivity timer.
6. The method of any of Embodiments 4-5 further comprising: providing communication between the wireless device and the wireless network using a communication resource on the second cell of the second set of cells defined by the second scheduling grant.
7. The method of any of Embodiments 1-6 further comprising: providing communication between the wireless device and the wireless network using a communication resource on the cell of the second set of cells defined by the scheduling grant.
8. The method of any of Embodiments 1-7, wherein the first set of cells are included in a first frequency range, wherein the second set of cells are included in a second frequency range, and wherein the first and second frequency ranges are non-overlapping.
9. The method of Embodiment 8, wherein the first frequency range is lower than the second frequency range.
10. The method of any of Embodiments 1-9, wherein the first inactivity timer duration is greater than the second inactivity timer duration.
11. A method of operating a wireless device configured for communication with a wireless network using first and second sets of cells, wherein the first set of cells is associated with a first inactivity timer duration, wherein the second set of cells is associated with a second inactivity timer duration, and wherein the first and second inactivity timer durations are different, the method comprising: receiving a scheduling grant for a cell of the second set of cells using a cell of the first set of cells; and responsive to receiving the scheduling grant, monitoring the cell of the first set of cells for subsequent grants for the cell of the second set of cells for a period following the scheduling grant defined by the second inactivity timer duration.
12. The method of Embodiment 11, wherein the cell of the first set of cells is a first cell of the first set of cells, and wherein the scheduling grant is a first scheduling grant, the method further comprising: receiving a second scheduling grant for a second cell of the first set of cells using the first cell of the first set of cells; and responsive to receiving the second scheduling grant, monitoring the first cell of the first set of cells for subsequent grants for the second cell of the first set of cells for a period following the second scheduling grant defined by the first inactivity timer duration.
13. The method of Embodiment 12 further comprising: providing communication between the wireless device and the wireless network using a communication resource on the second cell of the first set of cells defined by the second scheduling grant.
14. The method of Embodiment 11, where the cell of the second set of cells is a first cell of the second set of cells, and wherein the scheduling grant is a first scheduling grant, the method further comprising: receiving a second scheduling grant for a second cell of the second set of cells using the second cell of the second set of cells; and responsive to receiving the second scheduling grant, monitoring the second cell of the second set of cells for subsequent scheduling grants for the second cell of the second set of cells for a period following the second scheduling grant defined by the second inactivity timer.
15. The method of Embodiment 14 further comprising: responsive to receiving the second scheduling grant, monitoring a third cell of the second set of cells for subsequent scheduling grants for the third cell of the second set of cells for the period following the second scheduling grant defined by the second inactivity timer.
16. The method of any of Embodiments 14-15 further comprising: providing communication between the wireless device and the wireless network using a communication resource on the second cell of the second set of cells defined by the second scheduling grant.
17. The method of any of Embodiments 11-16 further comprising: providing communication between the wireless device and the wireless network using a communication resource on the cell of the second set of cells defined by the scheduling grant.
18. The method of any of Embodiments 11-17, wherein the first set of cells are included in a first frequency range, wherein the second set of cells are included in a second frequency range, and wherein the first and second frequency ranges are non-overlapping.

19. The method of Embodiment 18, wherein the first frequency range is lower than the second frequency range.
20. The method of any of Embodiments 11-19, wherein the first inactivity timer duration is greater than the second inactivity timer duration.
21. A method of operating a wireless device configured for communication with a wireless network using first and second sets of cells, wherein the first set of cells is associated with a first inactivity timer duration, wherein the second set of cells is associated with a second inactivity timer duration, and wherein the first and second inactivity timer durations are different, the method comprising: receiving a scheduling grant for a first cell of the second set of cells using a cell of the first set of cells; responsive to receiving the scheduling grant, monitoring the cell of the first set of cells for subsequent grants for the first cell of the second set of cells; and responsive to receiving the scheduling grant, monitoring a second cell of the second set of cells for subsequent grants for the second set of cells.
22. The method of Embodiment 21 further comprising: responsive to receiving the scheduling grant, monitoring a third cell of the second set of cells for subsequent grants for the second set of cells.
23. The method of any of any of Embodiments 21-22, wherein monitoring the cell of the first set of cells comprises monitoring the cell of the first set of cells for subsequent grants for the first cell of the second set of cells for a period following the scheduling grant defined by the second inactivity timer duration, and wherein monitoring the second cell of the second set of cells comprises monitoring the second cell of the second set of cells for subsequent grants for the second set of cells for the period following the scheduling grant defined by the second inactivity timer duration.
24. The method of any of Embodiments 21-23, wherein the cell of the first set of cells is a first cell of the first set of cells, and wherein the scheduling grant is a first scheduling grant, the method further comprising: receiving a second scheduling grant for a second cell of the first set of cells using the first cell of the first set of cells; and responsive to receiving the second scheduling grant, monitoring the first cell of the first set of cells for subsequent grants for the first set of cells for a period following the second scheduling grant defined by the first inactivity timer duration.
25. The method of Embodiment 24 further comprising: providing communication between the wireless device and the wireless network using a communication resource on the second cell of the first set of cells defined by the second scheduling grant.
26. The method of any of Embodiments 21-23, wherein the scheduling grant is a first scheduling grant, the method further comprising: receiving a second scheduling grant for the second cell of the second set of cells using the second cell of the second set of cells; responsive to receiving the second scheduling grant, monitoring the second cell of the second set of cells for subsequent scheduling grants for the second cell of the second set of cells; and responsive to receiving the second scheduling grant, monitoring the cell of the first set of cells for subsequent grants for the first cell of the second set of cells.
27. The method of Embodiment 26 wherein monitoring the second cell of the second set of cells responsive to receiving the second scheduling grant comprises monitoring the second cell of the second set of cells for subsequent scheduling grants for the second cell of the second set of cells for a period following the second scheduling grant defined by the second inactivity timer, and wherein monitoring the cell of the first set of cells responsive to receiving the second scheduling grant comprises monitoring the cell of the first set of cells for subsequent grants for the first cell of the second set of cells for a period following the second scheduling grant defined by the second inactivity timer.
28. The method of any of Embodiments 26-27 further comprising:
providing communication between the wireless device and the wireless network using a communication resource on the second cell of the second set of cells defined by the second scheduling grant.
29. The method of any of Embodiments 21-28 further comprising:
providing communication between the wireless device and the wireless network using a communication resource on the first cell of the second set of cells defined by the scheduling grant.
30. The method of any of Embodiments 21-29, wherein the first set of cells are included in a first frequency range, wherein the second set of cells are included in a second frequency range, and wherein the first and second frequency ranges are non-overlapping.
31. The method of Embodiment 30, wherein the first frequency range is lower than the second frequency range.
32. The method of any of Embodiments 21-31, wherein the first inactivity timer duration is greater than the second inactivity timer duration.
33. A wireless device (300) comprising: processing circuitry (303); and memory (305) coupled with the processing circuitry, wherein the memory includes instructions that when executed by the processing circuitry causes the wireless device to perform operations according to any of Embodiments 1-32.
34. A wireless device (300) adapted to perform according to any of Embodiments 1-32.
35. A computer program comprising program code to be executed by processing circuitry (303) of a wireless device (300), whereby execution of the program code causes the wireless device (300) to perform operations according to any of embodiments 1-32.
36. A computer program product comprising a non-transitory storage medium including program code to be executed by processing circuitry (303) of a wireless device (300), whereby execution of the program code causes the wireless device (300) to perform operations according to any of embodiments 1-32.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8:
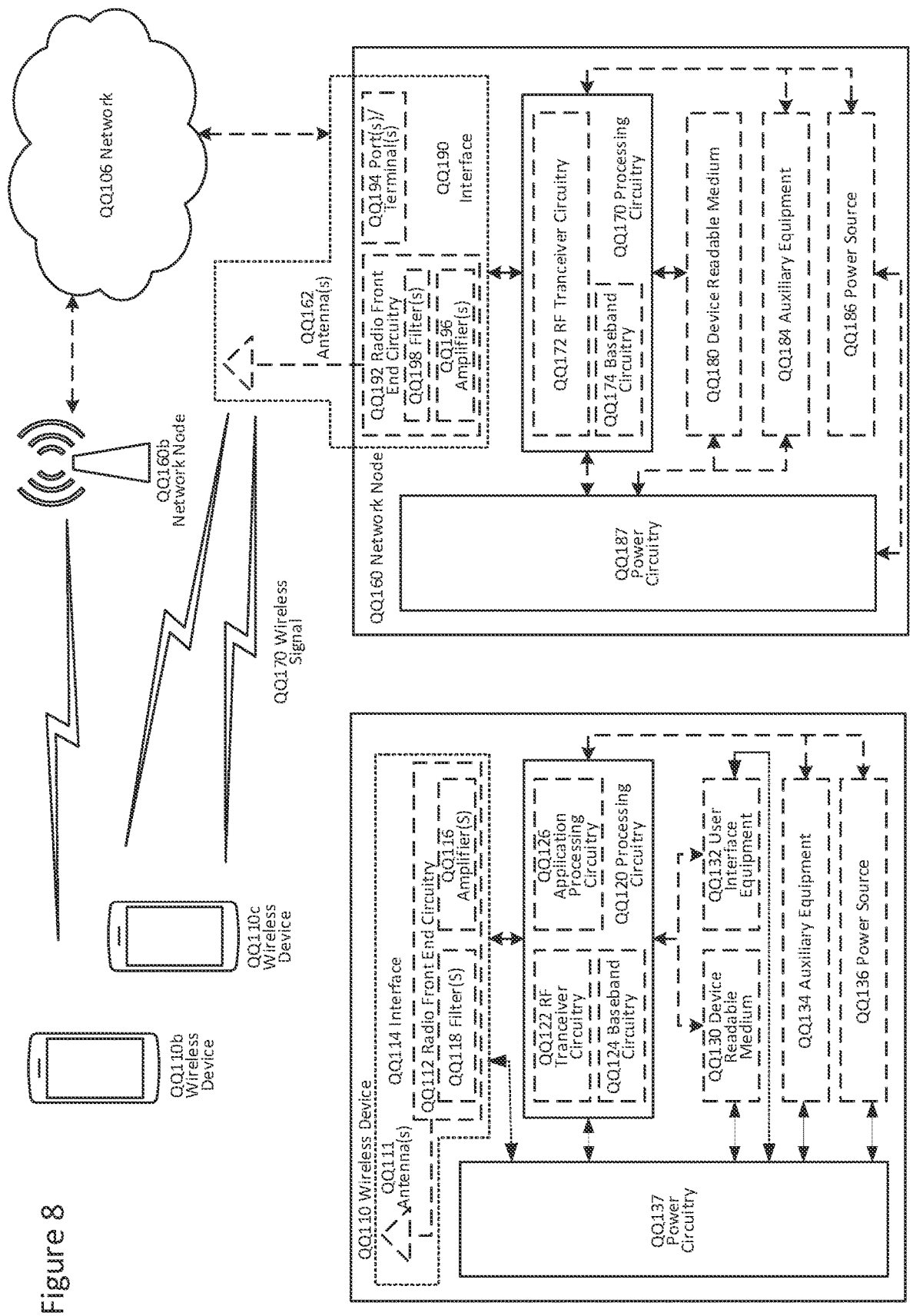
FIG. 8 is a block diagram of a wireless network in accordance with some embodiments.

FIG. 8 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 8 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 9:
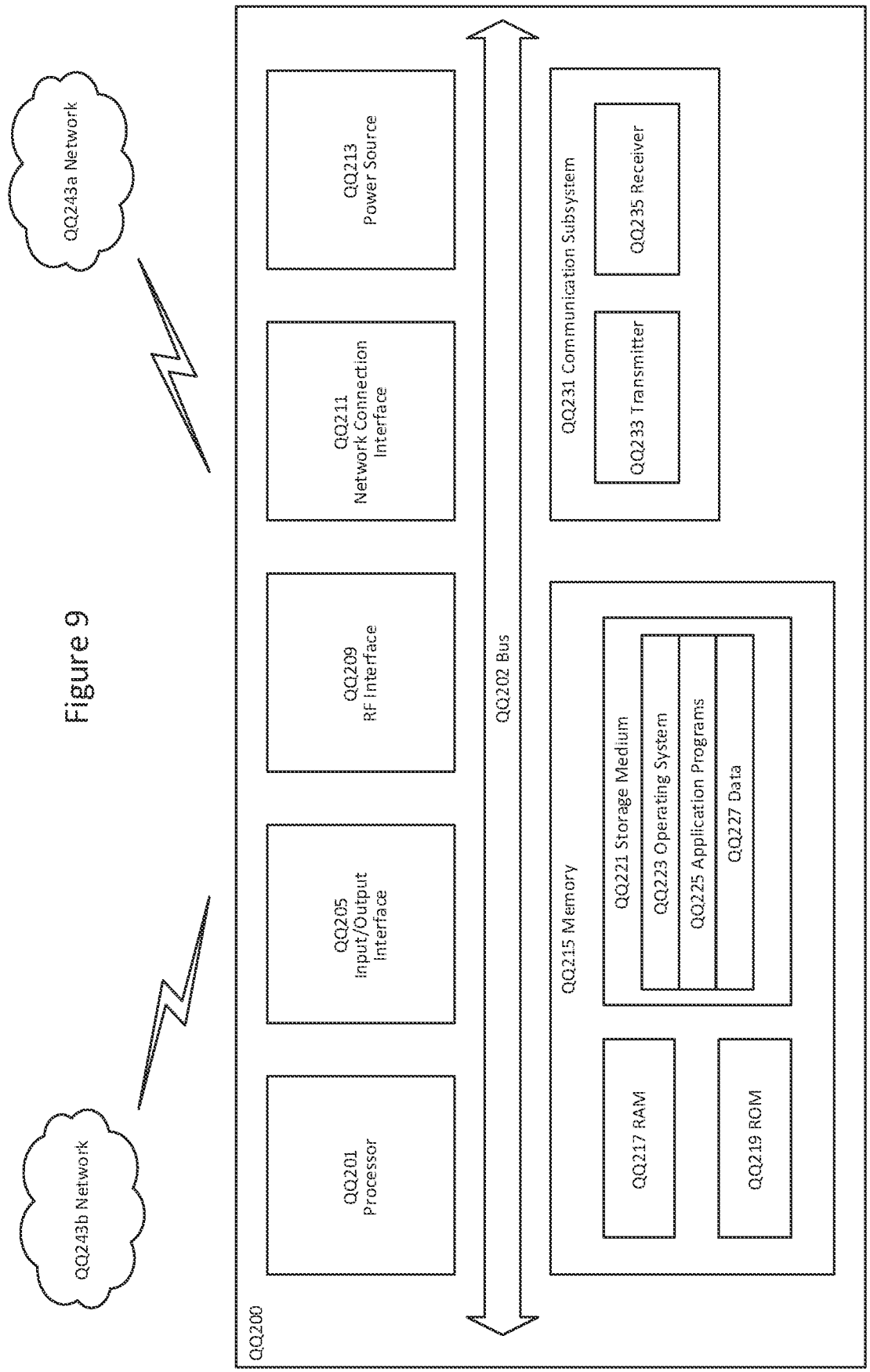
FIG. 9 is a block diagram of a user equipment in accordance with some embodiments

FIG. 9 illustrates a user Equipment in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 9, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 10:
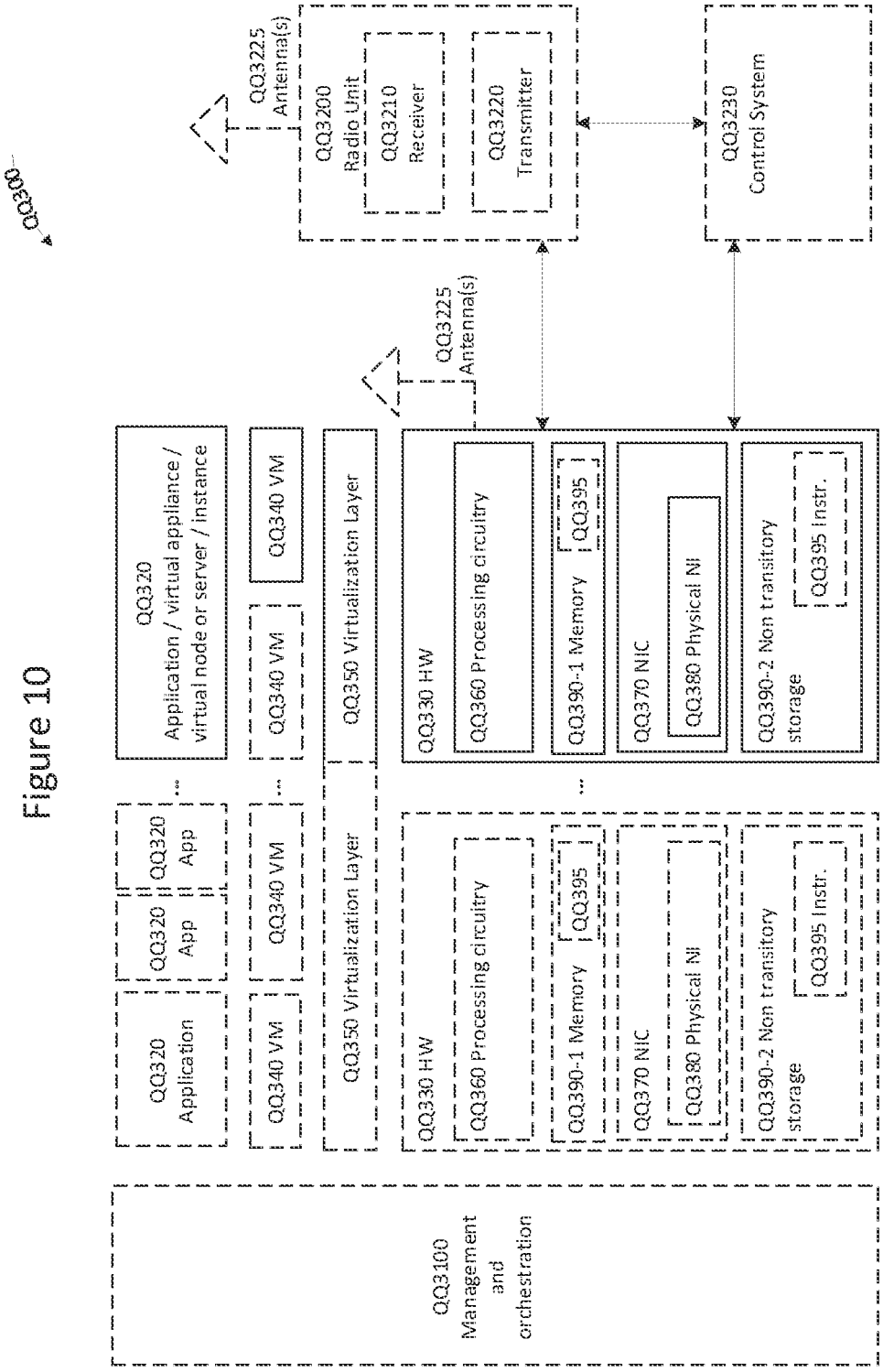
FIG. 10 is a block diagram of a virtualization environment in accordance with some embodiments.

FIG. 10 illustrates a virtualization environment in accordance with some embodiments.

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 10.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 11:
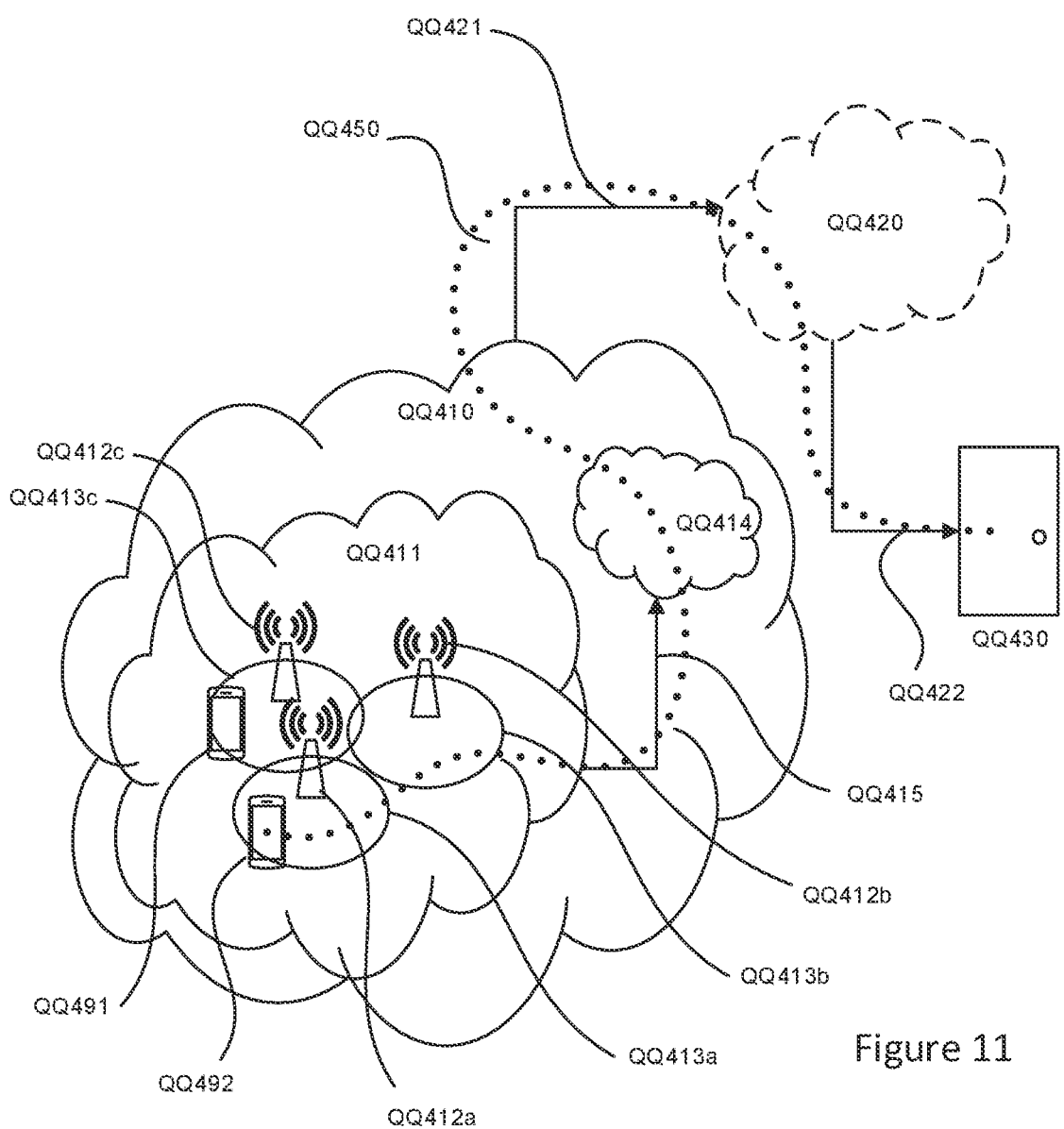
FIG. 11 is a block diagram of a telecommunication network connected via an intermediate network to a host computer in accordance with some embodiments.

FIG. 11 illustrates a telecommunication network connected via an intermediate network to a host computer in accordance with some embodiments.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 12:
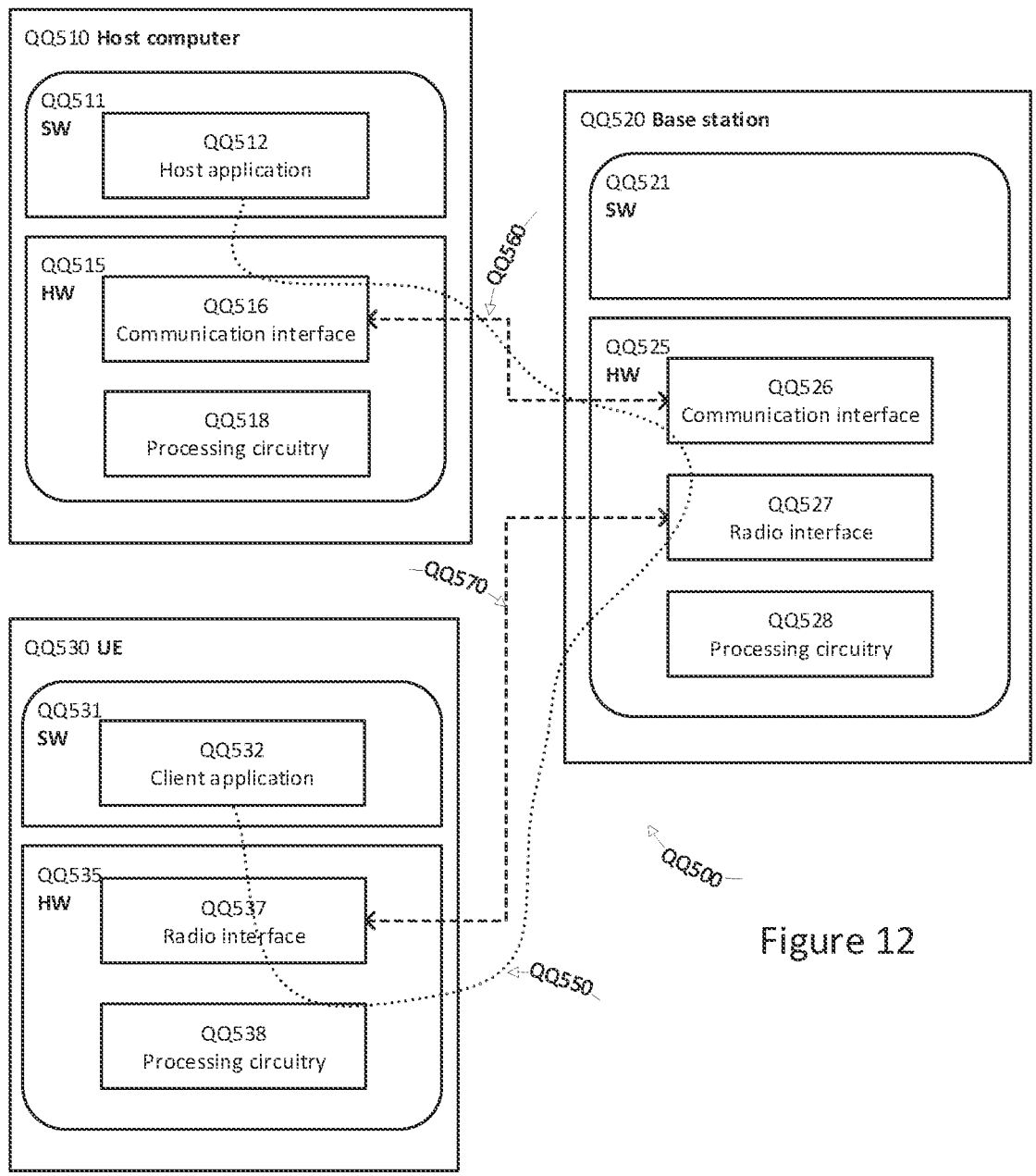
FIG. 12 is a block diagram of a host computer communicating via a base station with a user equipment over a partially wireless connection in accordance with some embodiments.

FIG. 12 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
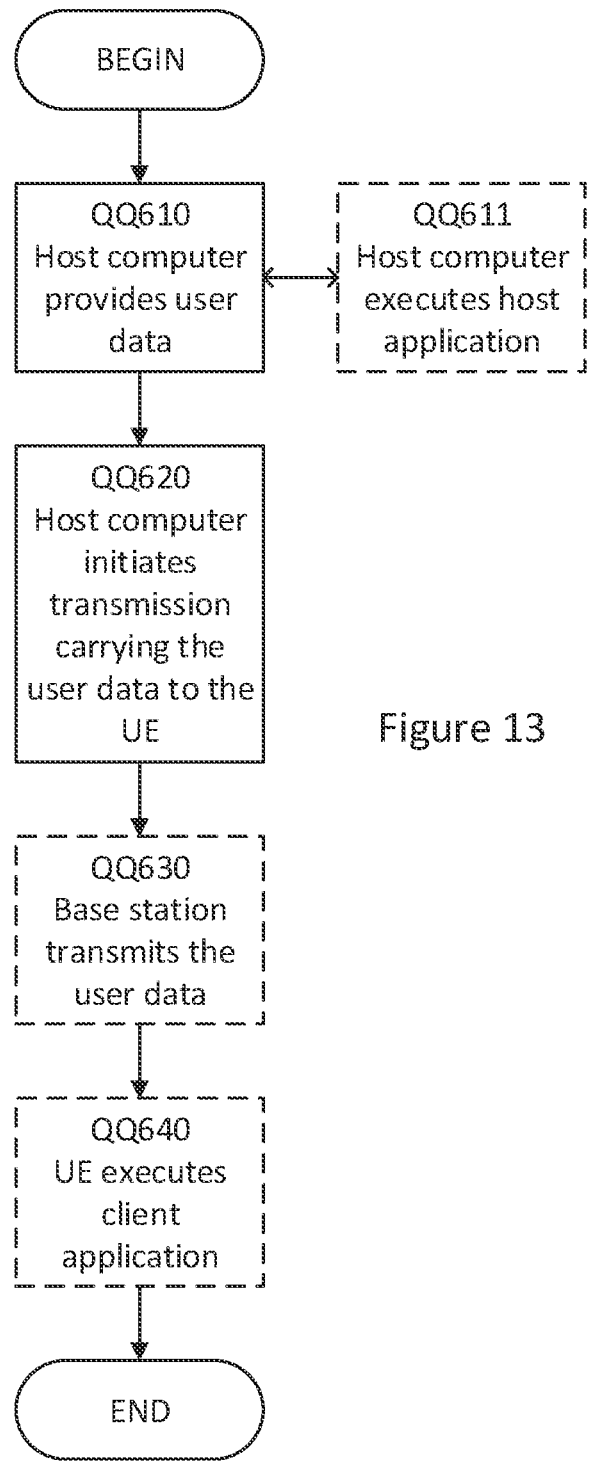
FIG. 13 is a block diagram of methods implemented in a communication system including a host computer, a base station and a user equipment in accordance with some embodiments.

FIG. 13 illustrates methods implemented in a communication system including a host computer, a base station and a user equipment in accordance with some embodiments FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 14:
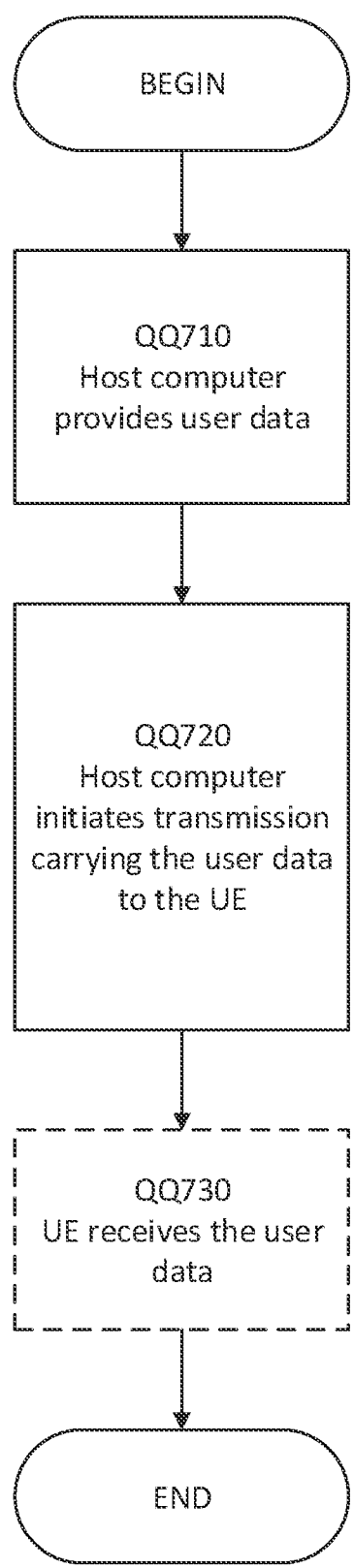
FIG. 14 is a block diagram of methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step QQ710 of the method, the host computer provides user data. In an optional sub step (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 15:
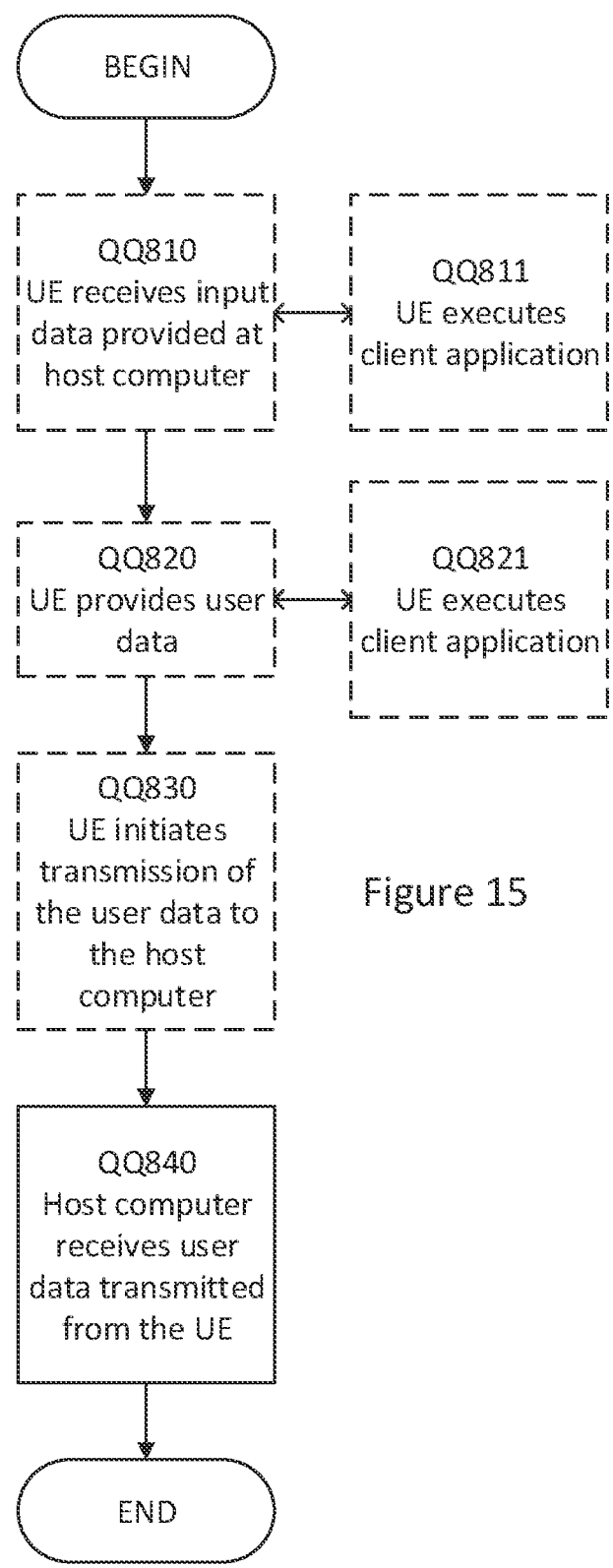
FIG. 15 is a block diagram of methods implemented in a communication system including a host computer, a base station and a user equipment in accordance with some embodiments.

FIG. 15 illustrates methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 16:
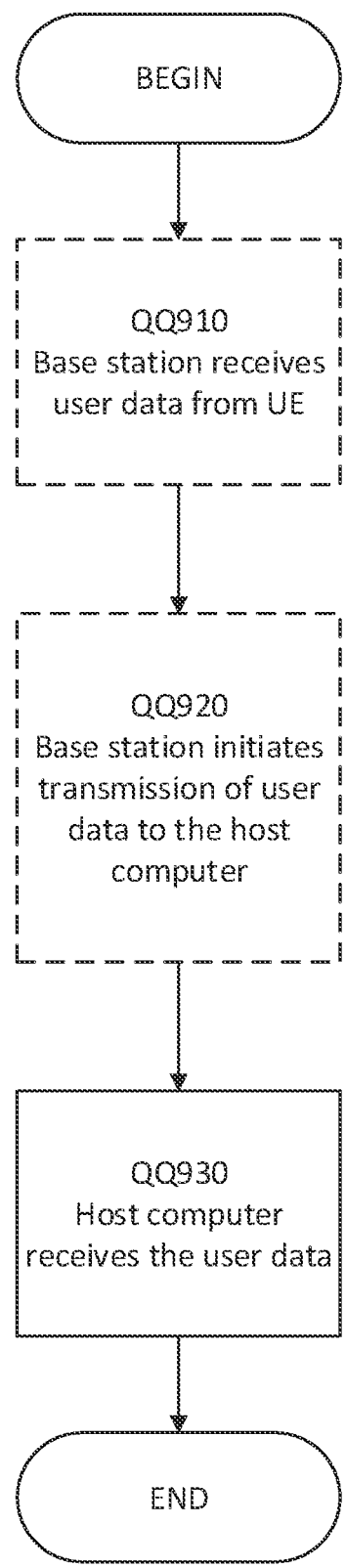
FIG. 16 is a block diagram of methods implemented in a communication system including a host computer, a base station and a user equipment in accordance with some embodiments.

FIG. 16 illustrates methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

- 1×RTT CDMA2000 1× Radio Transmission Technology
- 3GPP 3rd Generation Partnership Project
- 5G 5th Generation
- ABS Almost Blank Subframe
- ARQ Automatic Repeat Request
- AWGN Additive White Gaussian Noise
- BCCH Broadcast Control Channel
- BCH Broadcast Channel
- CA Carrier Aggregation
- CC Carrier Component
- CCCH SDU Common Control Channel SDU
- CDMA Code Division Multiplexing Access
- CGI Cell Global Identifier
- CIR Channel Impulse Response
- CP Cyclic Prefix
- CPICH Common Pilot Channel
- CPICH Ec/No CPICH Received energy per chip divided by the power density in the band
- CQI Channel Quality information
- C-RNTI Cell RNTI
- CSI Channel State Information
- DCCH Dedicated Control Channel
- DL Downlink
- DM Demodulation
- DMRS Demodulation Reference Signal
- DRX Discontinuous Reception
- DTX Discontinuous Transmission
- DTCH Dedicated Traffic Channel
- DUT Device Under Test
- E-CID Enhanced Cell-ID (positioning method)
- E-SMLC Evolved-Serving Mobile Location Centre
- ECGI Evolved CGI
- eNB E-UTRAN NodeB
- ePDCCH enhanced Physical Downlink Control Channel
- E-SMLC evolved Serving Mobile Location Center
- E-UTRA Evolved UTRA
- E-UTRAN Evolved UTRAN
- FDD Frequency Division Duplex
- FFS For Further Study
- GERAN GSM EDGE Radio Access Network
- gNB Base station in NR
- GNSS Global Navigation Satellite System
- GSM Global System for Mobile communication
- HARQ Hybrid Automatic Repeat Request
- HO Handover
- HSPA High Speed Packet Access
- HRPD High Rate Packet Data
- LOS Line of Sight
- LPP LTE Positioning Protocol
- LTE Long-Term Evolution
- MAC Medium Access Control
- MBMS Multimedia Broadcast Multicast Services
- MBSFN Multimedia Broadcast multicast service Single Frequency Network
- MBSFN ABS MBSFN Almost Blank Subframe
- MDT Minimization of Drive Tests
- MIB Master Information Block
- MME Mobility Management Entity
- MSC Mobile Switching Center
- NPDCCH Narrowband Physical Downlink Control Channel
- NR New Radio
- OCNG OFDMA Channel Noise Generator
- OFDM Orthogonal Frequency Division Multiplexing
- OFDMA Orthogonal Frequency Division Multiple Access
- OSS Operations Support System
- OTDOA Observed Time Difference of Arrival
- O&M Operation and Maintenance
- PBCH Physical Broadcast Channel
- P-CCPCH Primary Common Control Physical Channel
- PCell Primary Cell
- PCFICH Physical Control Format Indicator Channel
- PDCCH Physical Downlink Control Channel
- PDP Profile Delay Profile
- PDSCH Physical Downlink Shared Channel
- PGW Packet Gateway
- PHICH Physical Hybrid-ARQ Indicator Channel
- PLMN Public Land Mobile Network
- PMI Precoder Matrix Indicator
- PRACH Physical Random Access Channel
- PRS Positioning Reference Signal
- PSS Primary Synchronization Signal
- PUCCH Physical Uplink Control Channel
- PUSCH Physical Uplink Shared Channel
- RACH Random Access Channel
- QAM Quadrature Amplitude Modulation
- RAN Radio Access Network
- RAT Radio Access Technology
- RLM Radio Link Management
- RNC Radio Network Controller
- RNTI Radio Network Temporary Identifier
- RRC Radio Resource Control
- RRM Radio Resource Management
- RS Reference Signal
- RSCP Received Signal Code Power
- RSRP Reference Symbol Received Power OR Reference Signal Received Power
- RSRQ Reference Signal Received Quality OR Reference Symbol Received Quality
- RSSI Received Signal Strength Indicator
- RSTD Reference Signal Time Difference
- SCH Synchronization Channel
- SCell Secondary Cell SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless device configured for communication with a wireless network using first and second sets of cells, wherein the first set of cells is associated with a first inactivity timer duration, wherein the second set of cells is associated with a second inactivity timer duration, and wherein the first and second inactivity timer durations are different, the method comprising:
receiving a scheduling grant for a cell of the second set of cells using a cell of the first set of cells, wherein the cell of the second set of cells is a first cell of the second set of cells, and wherein the scheduling grant is a first scheduling grant;
responsive to receiving the first scheduling grant, monitoring the cell of the first set of cells for subsequent grants for a period following the scheduling grant defined by the first inactivity timer duration or defined by the second inactivity timer duration;
receiving a second scheduling grant for a second cell of the second set of cells using the second cell of the second set of cells; and
responsive to receiving the second scheduling grant, monitoring the second cell of the second set of cells for subsequent scheduling grants for the second cell of the second set of cells for a period following the second scheduling grant defined by the second inactivity timer duration, and monitoring a third cell of the second set of cells for subsequent scheduling grants for the third cell of the second set of cells for the period following the second scheduling grant defined by the second inactivity timer duration.

2. The method of claim 1, wherein the cell of the first set of cells is a first cell of the first set of cells, the method further comprising:
receiving the second scheduling grant for the second cell of the first set of cells using the first cell of the first set of cells; and
responsive to receiving the second scheduling grant, monitoring the first cell of the first set of cells for subsequent grants for the second cell of the first set of cells for a period following the second scheduling grant defined by the first inactivity timer duration.

3. The method of claim 1 further comprising:
responsive to receiving the scheduling grant, monitoring a second cell of the second set of cells for subsequent grants for the second set of cells.

4. The method of claim 3 further comprising:
responsive to receiving the scheduling grant, monitoring a third cell of the second set of cells for subsequent grants for the second set of cells.

5. The method of claim 3, wherein monitoring the cell of the first set of cells comprises monitoring the cell of the first set of cells for subsequent grants for the first cell of the second set of cells for a period following the scheduling grant defined by the second inactivity timer duration, and wherein monitoring the second cell of the second set of cells comprises monitoring the second cell of the second set of cells for subsequent grants for the second set of cells for the period following the scheduling grant defined by the second inactivity timer duration.

6. The method of claim 3, wherein the cell of the first set of cells is a first cell of the first set of cells, the method further comprising:
receiving a second scheduling grant for a second cell of the first set of cells using the first cell of the first set of cells; and
responsive to receiving the second scheduling grant, monitoring the first cell of the first set of cells for subsequent grants for the first set of cells for a period following the second scheduling grant defined by the first inactivity timer duration.

7. The method of claim 3, the method further comprising:
receiving a second scheduling grant for the second cell of the second set of cells using the second cell of the second set of cells;
responsive to receiving the second scheduling grant, monitoring the second cell of the second set of cells for subsequent scheduling grants for the second cell of the second set of cells; and
responsive to receiving the second scheduling grant, monitoring the cell of the first set of cells for subsequent grants for the first cell of the second set of cells.

8. The method of claim 7 wherein monitoring the second cell of the second set of cells responsive to receiving the second scheduling grant comprises monitoring the second cell of the second set of cells for subsequent scheduling grants for the second cell of the second set of cells for a period following the second scheduling grant defined by the second inactivity timer duration, and wherein monitoring the cell of the first set of cells responsive to receiving the second scheduling grant comprises monitoring the cell of the first set of cells for subsequent grants for the first cell of the second set of cells for a period following the second scheduling grant defined by the second inactivity timer duration.

9. The method of claim 1, wherein the first set of cells are included in a first frequency range, wherein the second set of cells are included in a second frequency range, and wherein the first and second frequency ranges are non-overlapping.

10. The method of claim 9, wherein the first frequency range is lower than the second frequency range.

11. The method of claim 1, wherein the first inactivity timer duration is greater than the second inactivity timer duration.

12. The method of claim 1, wherein the cell of the first set of cells is monitored for subsequent grants for the cell of the second set of cells for a period following the scheduling grant defined by the first inactivity timer duration.

13. The method of claim 1, wherein the cell of the first set of cells is monitored for subsequent grants for the cell of the second set of cells for a period following the scheduling grant defined by the second inactivity timer duration.

14. The method of claim 1, wherein receiving the scheduling grant for the cell of the second set of cells using the cell of the first set of cells comprises receiving the scheduling grant for the cell of the second set of cells on the cell of the first set of cells.

15. The method of claim 1, wherein monitoring the cell of the first set of cells for subsequent grants comprises monitoring the cell of the first set of cells for subsequent grants for the cell of the second set of cells for a period following the scheduling grant defined by the first inactivity timer duration or defined by the second inactivity timer duration.

16. A computer program product comprising a non-transitory storage medium including program code to be executed by processing circuitry of a wireless device, whereby execution of the program code causes the wireless device to perform operations according to claim 1.

17. A wireless device comprising:
processing circuitry; and
memory coupled with the processing circuitry, wherein the memory includes instructions that when executed by the processing circuitry causes the wireless device to,
receive a scheduling grant for a cell of a second set of cells using a cell of a first set of cells, wherein the first set of cells is associated with a first inactivity timer duration, wherein the second set of cells is associated with a second inactivity timer duration, wherein the first and second inactivity timer durations are different, and wherein the cell of the second set of cells is a first cell of the second set of cells, and wherein the scheduling grant is a first scheduling grant;
responsive to receiving the scheduling grant, monitor the cell of the first set of cells for subsequent grants for the cell of the second set of cells for a period following the scheduling grant defined by the first inactivity timer duration or defined by the second inactivity timer duration;
receive a second scheduling grant for a second cell of the second set of cells using the second cell of the second set of cells; and
responsive to receiving the second scheduling grant, monitor the second cell of the second set of cells for subsequent scheduling grants for the second cell of the second set of cells for a period following the second scheduling grant defined by the second inactivity timer duration, and monitor a third cell of the second set of cells for subsequent scheduling grants for the third cell of the second set of cells for the period following the second scheduling grant defined by the second inactivity timer duration.

18. The wireless device of claim 17, wherein the memory includes instructions that when executed by the processing circuitry causes the wireless device to perform operations, wherein the cell of the first set of cells is a first cell of the first set of cells, the method further comprising:
receiving the second scheduling grant for the second cell of the first set of cells using the first cell of the first set of cells; and
responsive to receiving the second scheduling grant, monitoring the first cell of the first set of cells for subsequent grants for the second cell of the first set of cells for a period following the second scheduling grant defined by the first inactivity timer duration.

* * * * *